United States Patent
Yi

(10) Patent No.: US 11,197,334 B2
(45) Date of Patent: Dec. 7, 2021

(54) METHOD AND APPARATUS FOR SUPPORTING DUAL CONNECTIVITY IN NR

(71) Applicant: LG ELECTRONICS INC., Seoul (KR)

(72) Inventor: Yunjung Yi, Seoul (KR)

(73) Assignee: LG ELECTRONICS INC., Seoul (KR)

(*) Notice: Subject to any disclaimer, the term of this patent is extended or adjusted under 35 U.S.C. 154(b) by 7 days.

(21) Appl. No.: 16/620,465

(22) PCT Filed: Jun. 8, 2018

(86) PCT No.: PCT/KR2018/006533
§ 371 (c)(1),
(2) Date: Dec. 6, 2019

(87) PCT Pub. No.: WO2018/226065
PCT Pub. Date: Dec. 13, 2018

(65) Prior Publication Data
US 2020/0154496 A1    May 14, 2020

Related U.S. Application Data

(60) Provisional application No. 62/517,100, filed on Jun. 8, 2017, provisional application No. 62/519,815, filed
(Continued)

(51) Int. Cl.
*H04W 76/15* (2018.01)
*H04W 72/04* (2009.01)
*H04W 72/10* (2009.01)

(52) U.S. Cl.
CPC .......... *H04W 76/15* (2018.02); *H04W 72/04* (2013.01); *H04W 72/10* (2013.01)

(58) Field of Classification Search
CPC . H04W 72/10; H04W 72/1268; H04W 72/04; H04W 72/0446; H04W 76/15;
(Continued)

(56) References Cited

U.S. PATENT DOCUMENTS

2014/0286206 A1    9/2014  Song et al.
2016/0014753 A1    1/2016  Wu et al.
(Continued)

FOREIGN PATENT DOCUMENTS

CA    2996405    3/2017

OTHER PUBLICATIONS

European Patent Office Application Serial No. 18813316.9, Search Report dated Apr. 14, 2020, 11 pages.
(Continued)

*Primary Examiner* — Brian D Nguyen
(74) *Attorney, Agent, or Firm* — Lee, Hong, Degerman, Kang & Waimey

(57) ABSTRACT

A method and an apparatus for supporting dual connectivity (DC) in new radio access technology (NR) are provided. As an embodiment, a method for performing uplink (UL) transmission by user equipment (UE) is provided. More specifically, the UE receives a semi-persistent configuration with respect to a first UL resource of a first carrier group (CG) and a second UL resource of a second CG that are separated from one another, and performs UL transmission to the first CG using the first UL resource only.

12 Claims, 20 Drawing Sheets

Related U.S. Application Data on Jun. 14, 2017, provisional application No. 62/520,671, filed on Jun. 16, 2017, provisional application No. 62/534,223, filed on Jul. 19, 2017, provisional application No. 62/564,211, filed on Sep. 27, 2017, provisional application No. 62/590,341, filed on Nov. 23, 2017, provisional application No. 62/590,395, filed on Nov. 24, 2017, provisional application No. 62/590,618, filed on Nov. 26, 2017.

(58) Field of Classification Search
CPC .... H04W 76/16; H04W 88/06; H04L 5/0098; H04L 5/0014
See application file for complete search history.

(56) References Cited

U.S. PATENT DOCUMENTS

| | | | |
|---|---|---|---|
| 2016/0227570 A1 | 8/2016 | Wei et al. | |
| 2016/0302209 A1* | 10/2016 | Behravan | H04L 5/0066 |
| 2020/0022098 A1* | 1/2020 | Takeda | H04L 1/1861 |
| 2020/0100272 A1* | 3/2020 | Takeda | H04L 1/1861 |
| 2020/0128517 A1* | 4/2020 | Dinan | H04L 5/0053 |
| 2020/0245257 A1* | 7/2020 | Pelletier | H04W 52/365 |
| 2020/0274664 A1* | 8/2020 | Dinan | H04L 1/0004 |
| 2020/0288342 A1* | 9/2020 | Zhang | H04W 72/0453 |
| 2020/0337065 A1* | 10/2020 | Dinan | H04W 72/1231 |
| 2021/0075567 A1* | 3/2021 | Velde | H04W 76/15 |
| 2021/0076377 A1* | 3/2021 | Horiuchi | H04W 72/04 |

OTHER PUBLICATIONS

3rd Generation Partnership Project (3GPP), "Technical Specification Group Radio Access Network; Study on New Radio (NR) access technology (Release 14)," 3GPP TR 38 912 V14.0.0, Mar. 2017, 74 pages.

Mediatek, "TDM UL transmission for TDD-FDD DL CA-capable UE with single transmitter", 3GPP TSG RAN WG1 Meeting #76, R1-140236, Feb. 2014, 4 pages.

NTT Docomo, "LTE-NR co-existence for downlink", 3GPP TSG RAN WG1 AH NR Meeting, R1-1700630, Jan. 2017, 5 pages.

LG Electronics, "Remaining issues in NR LTE coexistence", 3GPP TSG RAN WG1 Meeting NR#3, R1-1715904, Sep. 2017, 7 pages.

PCT International Application No. PCT/KR2018/006533, International Search Report dated Sep. 12, 2018, 4 pages.

CATT, "Support of UL carrier sharing between NR-LTE", 3GPP TSG RAN WG1 Meeting #89, R1-1707528, May 2017, 5 pages.

LG Electronics, "Discussion on Scheduling/HARQ for dual connectivity", 3GPP TSG RAN WG1 Meeting #89, R1-1707667, May 2017, 5 pages.

Apple, "Uplink sharing in NSA mode", 3GPP TSG RAN WG1 Meeting #89, R1-1708276, May 2017, 8 pages.

NEC, "Dual Connectivity between E-UTRA and NR", 3GPP TSG RAN WG1 Meeting #89, R1-1707808, May 2017, 5 pages.

European Patent Office Application Serial No. 18813316.9, Summons to attend oral proceedings pursuant to Rule 115(1) EPD, dated May 27, 2021, 17 pages.

* cited by examiner

METHOD AND APPARATUS FOR SUPPORTING DUAL CONNECTIVITY IN NR

CROSS-REFERENCE TO RELATED APPLICATIONS

This application is the National Stage filing under 35 U.S.C. 371 of International Application No. PCT/KR2018/006533, filed on Jun. 8, 2018, which claims the benefit of U.S. Provisional Application No. 62/517,100, filed on Jun. 8, 2017, 62/519,815, filed on Jun. 14, 2017, 62/520,671, filed on Jun. 16, 2017, 62/534,223, filed on Jul. 19, 2017, 62/564,211, filed on Sep. 27, 2017, 62/590,341, filed on Nov. 23, 2017, 62/590,395, filed on Nov. 24, 2017, and 62/590,618, filed on Nov. 26, 2017, the contents of which are all hereby incorporated by reference herein in their entirety.

TECHNICAL FIELD

The present disclosure relates to wireless communication, and more particularly, to a method and apparatus for supporting dual connectivity in a new radio access technology (NR).

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

As more communication devices require great communication capacity, a demand with respect to enhanced mobile broadband (eMBB) communication is spotlighted. Further, there is a main issue that a plurality of devices and objects are connected so that large machine type communication (MTC) providing various services regardless of time and location to be considered as next generation communication. Further, ultra-reliable and low latency communication (URLLC) considering service/user equipment (UE) sensitive to reliability and delay has been discussed. As described above, introduction of a next generation radio access technology considering eMBB, a large MTC, URLLC has been discussed. For convenience of the description, such new radio access technology may refer to a new radio access technology (NR).

A wavelength is short in a millimeter wave (mmW) so that a plurality of antennas may be installed at the same area. For example, the wavelength is 1 cm at a 30 GHz band, total 100 antenna elements may be installed in a secondary arrangement form at 0.5λ (wavelength) on a panel of 5×5 $cm^2$. Accordingly, a plurality of antenna elements is used at the mmW band so that a beamforming gain is increased to increase coverage or a throughput.

In this case, if a transceiver is included to adjust transmission power and a phase by antenna element, an independent beamforming is possible by frequency resource. However, if transceivers are installed at 100 antenna elements, respectively, the effectiveness is deteriorated in a cost side. Accordingly, it is considered that a plurality of antenna elements are mapped to one transceiver and a direction of a beam are adjusted to an analog phase shifter. Such an analog beamforming scheme can create only one beam direction so that a frequency selective beamforming cannot be performed.

A hybrid beamforming having B transceivers having the number less than Q antenna elements in an intermediate form of digital beamforming and analog beamforming may be considered. In this case, although the number of direction of the beam capable of being simultaneously transmitted is changed according to a connection scheme of B transceivers and Q antenna elements, the number of direction of the beam is limited to less than B.

According to unique characteristics of NR, a structure of a physical channel and/or related characteristics of NR may be different from those of an existing LTE. For an efficient operation of the NR, various schemes may be suggested.

SUMMARY

The present disclosure provides a method and apparatus for designing a control channel for supporting a dual connectivity (DC) in a new radio access technology (NR). In the present disclosure, the DC may include a synchronous DC and an asynchronous DC. In addition, the present disclosure discusses a DC sharing only an uplink (UL) spectrum. In addition, the present disclosure discusses a DC between two CGs, when a user equipment (UE) is capable of performing UL transmission only in one carrier group (CG) at a given time.

In an aspect, a method of performing uplink (UL) transmission by a user equipment (UE) in a wireless communication system is provided. The method includes receiving a semi-static configuration for a first UL resource of a first carrier group (CG) and a second UL resource of a second CG which are separated from each other, and performing UL transmission to the first CG by using only the first UL resource.

In another aspect, a user equipment (UE) in a wireless communication system is provided. The UE includes a memory, a transceiver, and a processor operatively coupled with the memory and the transceiver. The processor controls the transceiver to receive a semi-static configuration for a first UL resource of a first carrier group (CG) and a second UL resource of a second CG which are separated from each other, and perform UL transmission to the first CG by using only the first UL resource.

Dual connectivity can be supported efficiently in NR.

DETAILED DESCRIPTION

Hereinafter, the following description will be made while focusing on an NR based wireless communication system. However, the present disclosure is limited thereto. The present disclosure is applicable to another wireless communication system, for example, 3rd generation partnership project (3GPP) long-term evolution (LTE)/LTE-A(advanced) or institute of electrical and electronics engineers (IEEE) having the same characteristic to be described below.

Figure 1:
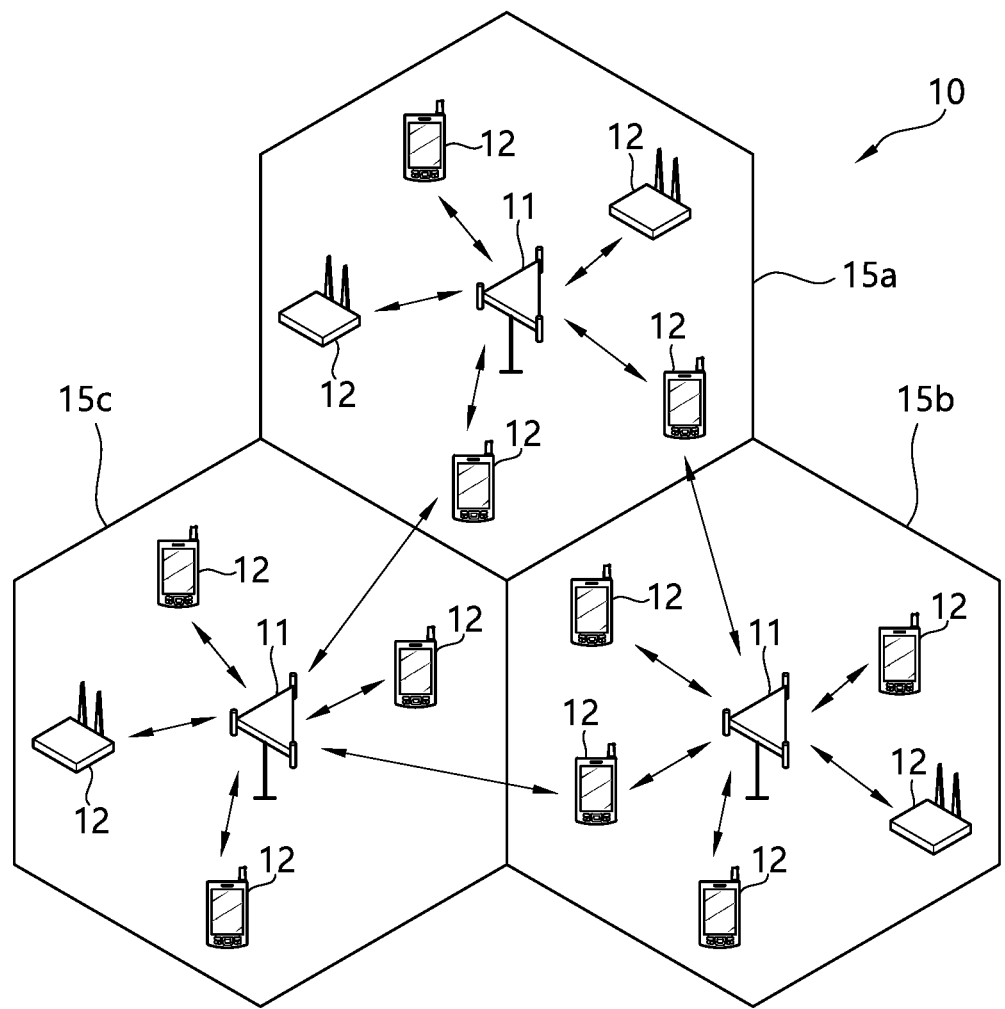
FIG. 1 shows a wireless communication system.

FIG. 1 shows a wireless communication system. The wireless communication system 10 includes at least one base station (BS) 11. Respective BSs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile terminal (MT), user terminal (UT), subscriber station (SS), wireless device, personal digital assistant (PDA), wireless modem, handheld device. The BS 11 generally refers to a fixed station that communicates with the UE 12 and may be called by other names such as evolved NodeB (eNB), base transceiver system (BTS), access point (AP), etc.

In general, a UE belongs to one cell, and the cell to which a UE belongs is called a serving cell. A BS providing a communication service to the serving cell is called a serving BS. The wireless communication system is a cellular system, so a different cell adjacent to the serving cell exists. The different cell adjacent to the serving cell is called a neighbor cell. A BS providing a communication service to the neighbor cell is called a neighbor BS. The serving cell and the neighbor cell are relatively determined based on a UE.

This technique can be used for DL or UL. In general, DL refers to communication from the BS 11 to the UE 12, and UL refers to communication from the UE 12 to the BS 11. In DL, a transmitter may be part of the BS 11 and a receiver may be part of the UE 12. In UL, a transmitter may be part of the UE 12 and a receiver may be part of the BS 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

Figure 2:
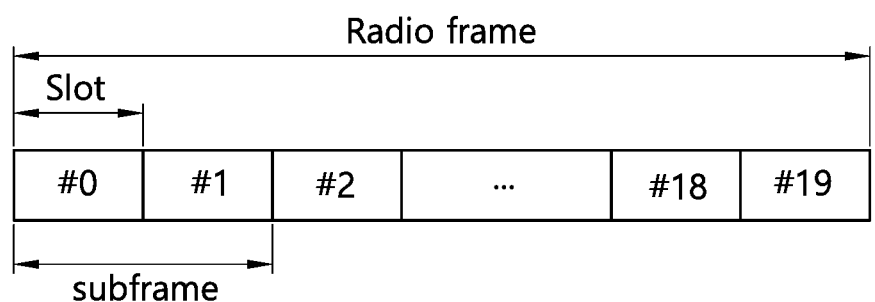
FIG. 2 shows structure of a radio frame of 3GPP LTE.

FIG. 2 shows structure of a radio frame of 3GPP LTE. Referring to FIG. 2, a radio frame includes 10 subframes. A subframe includes two slots in time domain. A time for transmitting one transport block by higher layer to physical layer (generally over one subframe) is defined as a transmission time interval (TTI). For example, one subframe may have a length of 1 ms, and one slot may have a length of 0.5 ms. One slot includes a plurality of orthogonal frequency division multiplexing (OFDM) symbols in time domain. Since the 3GPP LTE uses the OFDMA in the DL, the OFDM symbol is for representing one symbol period. The OFDM symbols may be called by other names depending on a multiple-access scheme. For example, when SC-FDMA is in use as a UL multi-access scheme, the OFDM symbols may be called SC-FDMA symbols. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

The wireless communication system may be divided into a frequency division duplex (FDD) scheme and a time division duplex (TDD) scheme. According to the FDD scheme, UL transmission and DL transmission are made at different frequency bands. According to the TDD scheme, UL transmission and DL transmission are made during different periods of time at the same frequency band. A channel response of the TDD scheme is substantially reciprocal. This means that a DL channel response and a UL channel response are almost the same in a given frequency band. Thus, the TDD-based wireless communication system is advantageous in that the DL channel response can be obtained from the UL channel response. In the TDD scheme, the entire frequency band is time-divided for UL and DL transmissions, so a DL transmission by the BS and a UL transmission by the UE cannot be simultaneously performed. In a TDD system in which a UL transmission and a DL transmission are discriminated in units of subframes, the UL transmission and the DL transmission are performed in different subframes.

Figure 3:
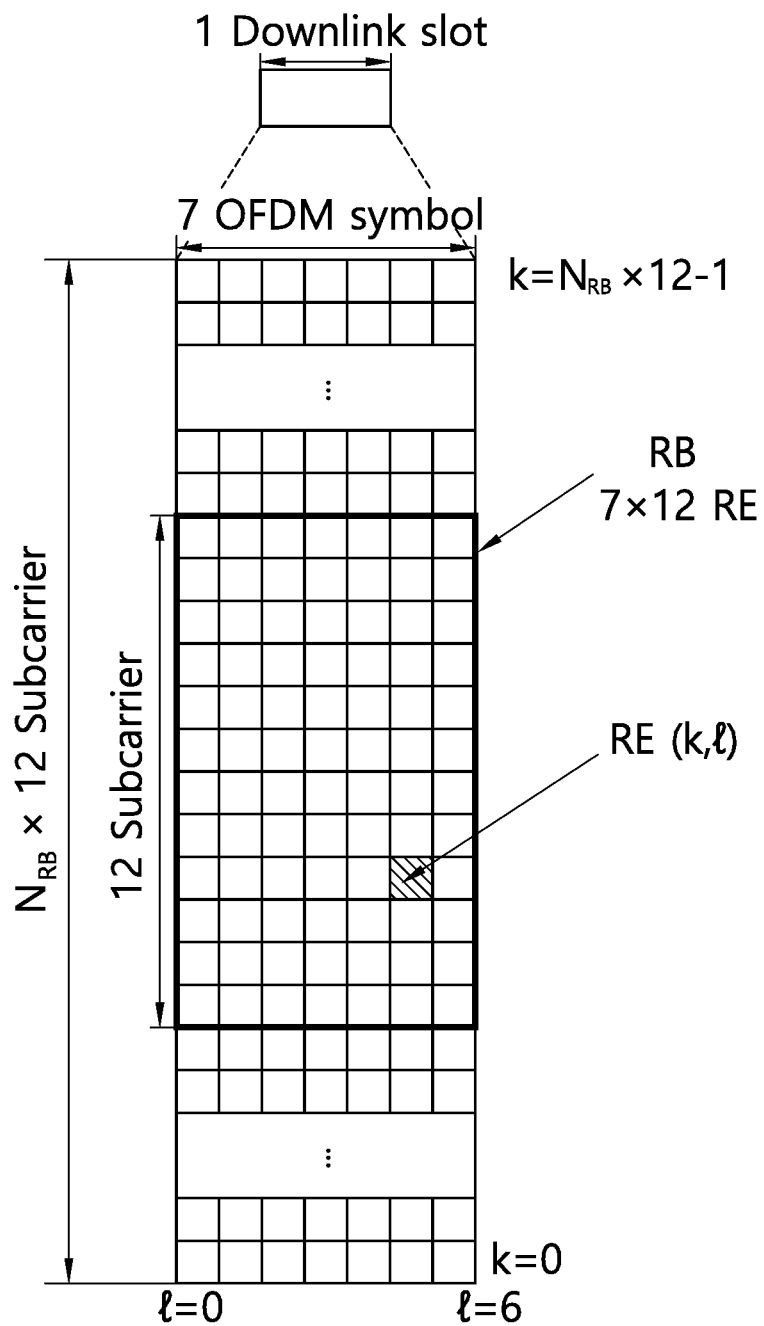
FIG. 3 shows a resource grid for one downlink slot.

FIG. 3 shows a resource grid for one downlink slot. Referring to FIG. 3, a DL slot includes a plurality of OFDM symbols in time domain. It is described herein that one DL slot includes 7 OFDM symbols, and one RB includes 12 subcarriers in frequency domain as an example. However, the present disclosure is not limited thereto. Each element on the resource grid is referred to as a resource element (RE). One RB includes 12×7 resource elements. The number $N^{DL}$ of RBs included in the DL slot depends on a DL transmit bandwidth. The structure of a UL slot may be same as that of the DL slot. The number of OFDM symbols and the number of subcarriers may vary depending on the length of a CP, frequency spacing, etc. For example, in case of a normal cyclic prefix (CP), the number of OFDM symbols is 7, and in case of an extended CP, the number of OFDM symbols is 6. One of 128, 256, 512, 1024, 1536, and 2048 may be selectively used as the number of subcarriers in one OFDM symbol.

DL subframe may be divided into a control region to be assigned with a control channel and a data region to be assigned with a physical downlink shared chancel (PDSCH). Examples of DL control channels used in the 3GPP LTE includes a physical control format indicator channel (PCFICH), a physical downlink control channel (PDCCH), a physical hybrid automatic repeat request (HARQ) indicator channel (PHICH), etc. The PCFICH is transmitted at a first OFDM symbol of a subframe and carries information regarding the number of OFDM symbols used for transmission of control channels within the subframe. The PHICH is a response of UL transmission and carries a HARQ acknowledgment (ACK)/non-acknowledgment (NACK) signal. Control information transmitted through the PDCCH is referred to as downlink control information (DCI). The DCI includes UL or DL scheduling information or includes a UL transmit (Tx) power control command for arbitrary UE groups.

The PDCCH may carry a transport format and a resource allocation of a downlink shared channel (DL-SCH), resource allocation information of an uplink shared channel (UL-SCH), paging information on a paging channel (PCH), system information on the DL-SCH, a resource allocation of an upper-layer control message such as a random access response transmitted on the PDSCH, a set of Tx power control commands on individual UEs within an arbitrary UE group, a Tx power control command, activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups.

A format of the PDCCH and the number of bits of the available PDCCH are determined according to a correlation between the number of CCEs and the coding rate provided by the CCEs. The eNB determines a PDCCH format according to a DCI to be transmitted to the UE, and attaches a cyclic redundancy check (CRC) to control information. The CRC is scrambled with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be scrambled to the CRC. Alternatively, if the PDCCH is for a paging message, a paging indicator identifier (e.g., paging-RNTI (P-RNTI)) may be scrambled to the CRC. If the PDCCH is for system information (more specifically, a system information block (SIB) to be described below), a system information identifier and a system information RNTI (SI-RNTI) may be scrambled to the CRC. To indicate a random access response that is a response for transmission of a random access preamble of the UE, a random access-RNTI (RA-RNTI) may be scrambled to the CRC.

A UL subframe can be divided in a frequency domain into a control region and a data region. The control region is allocated with a physical uplink control channel (PUCCH) for carrying UL control information. The data region is allocated with a physical uplink shared channel (PUSCH) for carrying user data. When indicated by a higher layer, the UE may support a simultaneous transmission of the PUSCH and the PUCCH. The PUCCH for one UE is allocated to an RB pair in a subframe. RBs belonging to the RB pair occupy different subcarriers in respective two slots. This is called that the RB pair allocated to the PUCCH is frequency-hopped in a slot boundary. This is said that the pair of RBs allocated to the PUCCH is frequency-hopped at the slot boundary. The UE can obtain a frequency diversity gain by transmitting UL control information through different subcarriers according to time.

UL control information transmitted on the PUCCH may include a HARQ ACK/NACK, a channel quality indicator (CQI) indicating the state of a DL channel, a scheduling request (SR), and the like. The PUSCH is mapped to a UL-SCH, a transport channel. UL data transmitted on the PUSCH may be a transport block, a data block for the UL-SCH transmitted during the TTI. The transport block may be user information. Or, the UL data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the UL data may include only control information.

5G system is a 3GPP system consisting of 5G access network (AN), 5G core network (CN) and UE. 5G AN is an access network comprising a next generation radio access network (NG-RAN) and/or non-3GPP access network connecting to a 5G core network.

Figure 4:
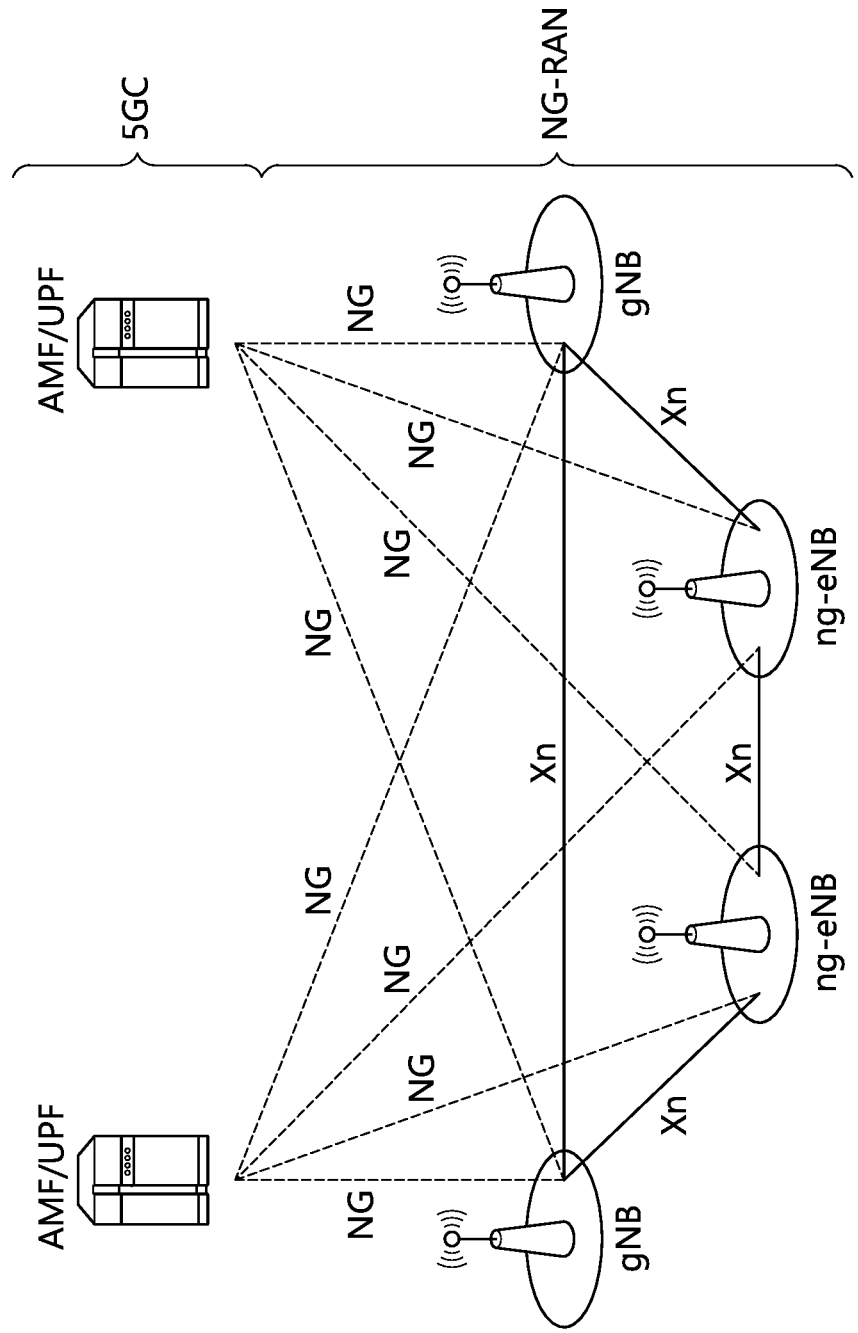
FIG. 4 shows an NG-RAN architecture.

FIG. 4 shows an NG-RAN architecture. Referring to FIG. 4, the NG-RAN includes at least one NG-RAN node. The NG-RAN node includes at least one gNB and/or at least one ng-eNB. The gNB provides NR user plane and control plane protocol terminations towards the UE. The ng-eNB provides E-UTRA user plane and control plane protocol terminations towards the UE. The gNBs and ng-eNBs are interconnected with each other by means of the Xn interface. The gNBs and ng-eNBs are also connected by means of the NG interfaces to the 5G CN. More specifically, the gNBs and ng-eNBs are connected to the access and mobility management function (AMF) by means of the NG-C interface and to the user plane function (UPF) by means of the NG-U interface.

Figure 5:
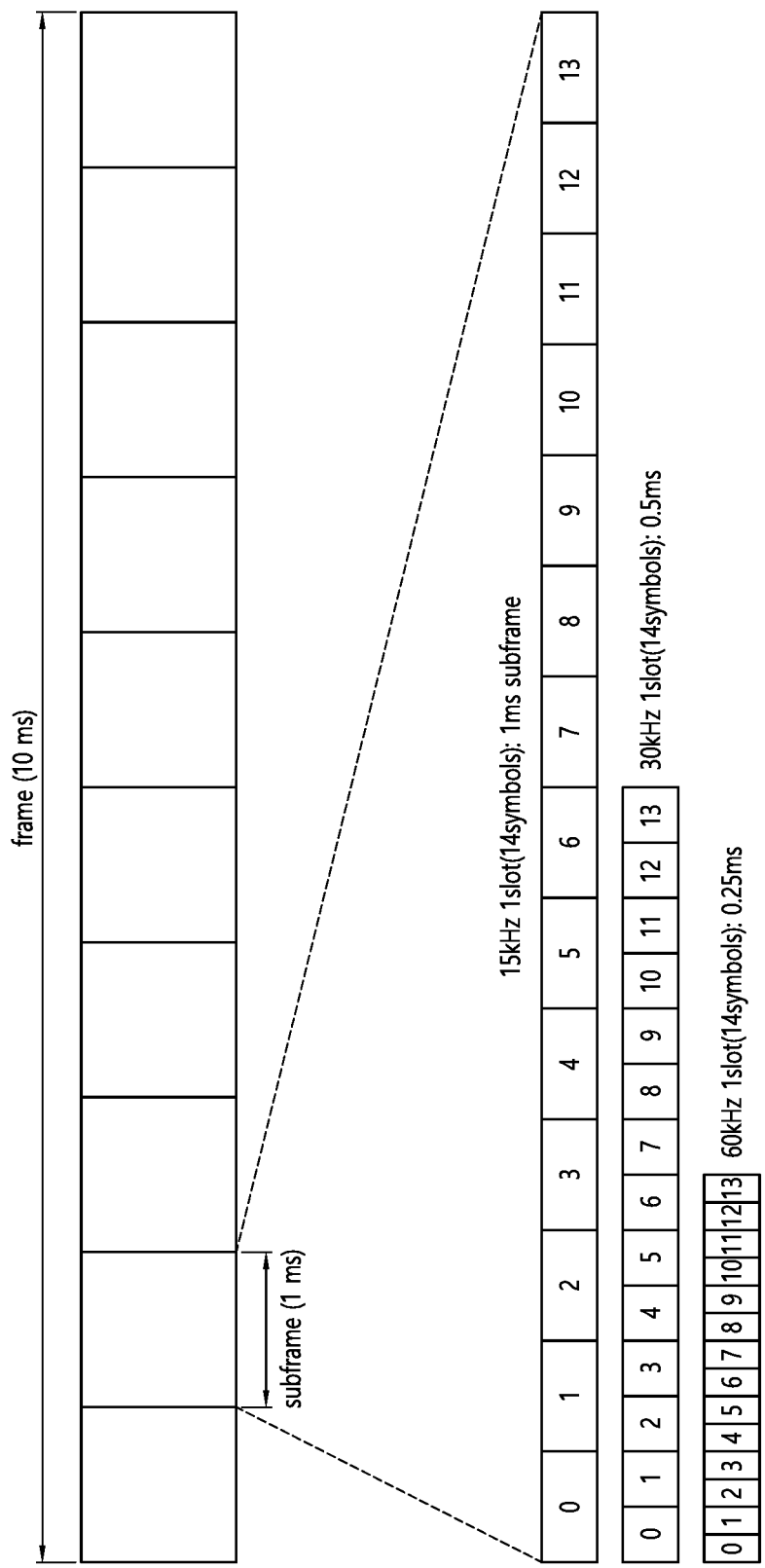
FIG. 5 shows an example of a frame structure of NR.

FIG. 5 shows an example of a frame structure of NR.

Referring to FIG. 5, in NR, DL transmission and UL transmission are configured within a frame having a length of 10 ms. One frame is configured of 10 subframes having a length of 1 ms. Each frame is divided in to two half-frames each having the same size, and a half-frame 0 is configured of subframes 0 to 4, and a half-frame 1 is configured of subframes 5 to 9. On a carrier, one frame set may be present in UL, and one frame set may be present in DL.

In NR, a plurality of numerologies may be supported. Each of the plurality of numerologies may be mapped to different subcarrier spacings. For example, the plurality of numerologies to be supported may be mapped to various subcarrier spacings of 15 kHz, 30 kHz, 60 kHz, 120 kHz, and 240 kHz.

Table 1 shows a subcarrier spacing based on each numerology, and an available CP. In Table 1, a parameter $\mu$ denotes each numerology, and $\Delta f$ denotes a subcarrier spacing

TABLE 1

| $\mu$ | $\Delta f = 2^\mu * 15$ [kHz] | CP |
|---|---|---|
| 0 | 15 | normal CP |
| 1 | 30 | normal CP |
| 2 | 60 | normal/extended CP |
| 3 | 120 | normal CP |
| 4 | 240 | normal CP |

A subframe may include one or a plurality of slots according to a numerology and/or a subcarrier spacing. That is, the slot is configured for each numerology within the subframe. For example, in a numerology mapped to a subcarrier spacing of 15 kHz, one subframe includes one slot. In a numerology mapped to a subcarrier spacing of 30 kHz, one subframe includes 2 slots. In a numerology mapped to a subcarrier spacing of 60 kHz, one subframe includes 4 slots. In a numerology mapped to a subcarrier spacing of 120 kHz, one subframe includes 8 slots. In a numerology mapped to a subcarrier spacing of 240 kHz, one subframe includes 16 slots. The number of OFDM symbols per slot may be maintained constantly to 14. A start point of the slot in the subframe may be aligned on a time domain with a start point of the OFDM symbol in the same subframe. Table 2 shows the number $N_{symb}^{slot}$ of OFDM symbols in the slot according to each numerology, the number $N_{symb}^{subframe,\mu}$ of slots in a frame according to each numerology, and the number $N_{symb}^{subframe,\mu}$ of slots in the subframe according to each numerology.

TABLE 2

| $\mu$ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

That is, a case of $\mu$=0, 1, 2 is shown in FIG. 5.

The plurality of OFDM symbols included in the slot may be classified into any one of a DL symbol, a UL symbol, and a flexible symbol. In the DL slot, the UE may assume that DL transmission occurs only in the DL symbol or the flexible symbol. In the UL slot, the UE may perform UL transmission only in the DL slot or the flexible symbol. A format of the slot may be determined according to which symbol is used to configure the OFDM symbol in the slot among the DL symbol, the UL symbol, and the flexible symbol. In the UE, the format of the slot may be configured through a higher layer signal, the format of the slot may be configured through DCI, or the format of the slot may be configured on the basis of a combination of the higher layer signal and the DCI.

Figure 6:
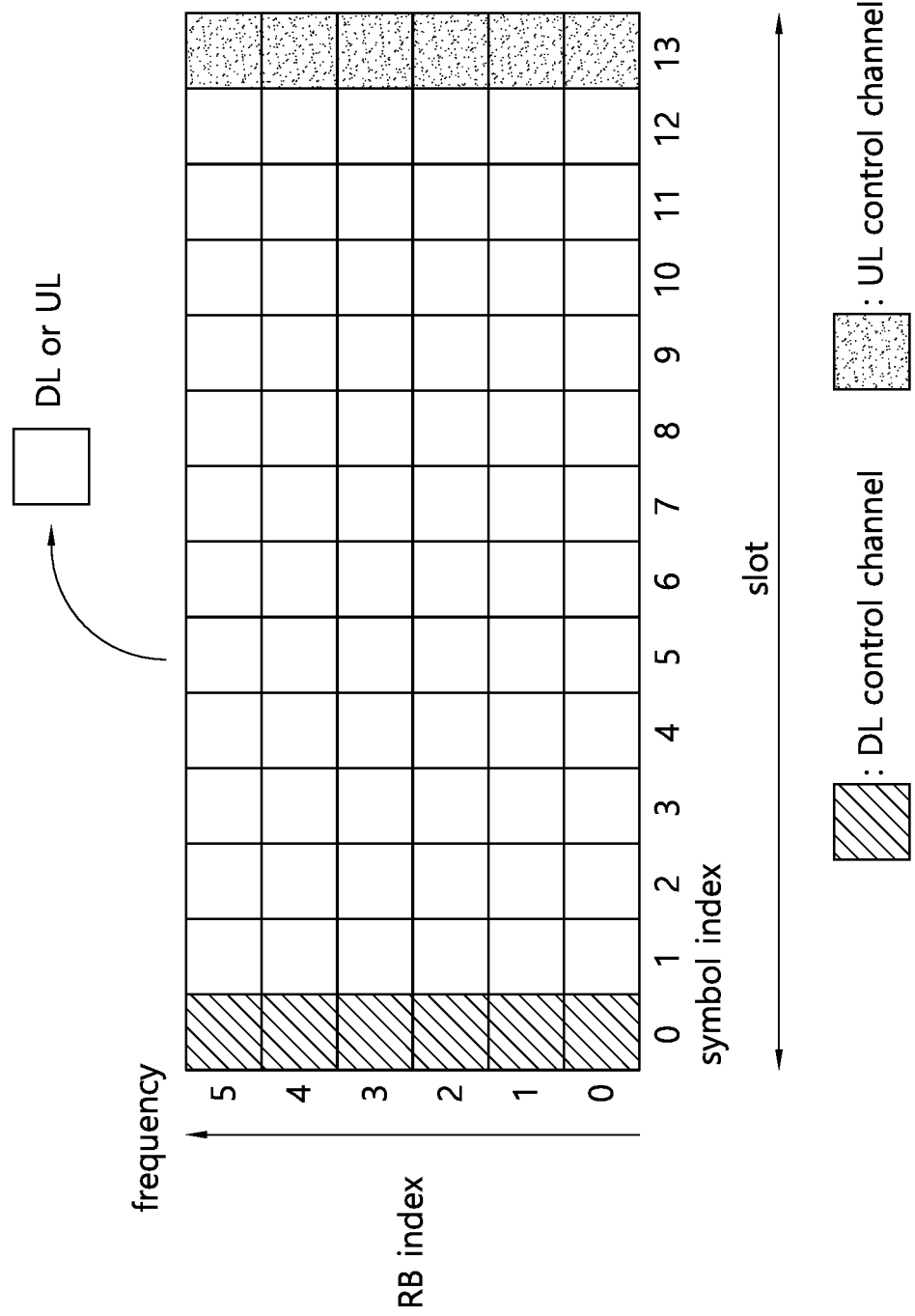
FIG. 6 shows an example of a subframe structure in NR.

FIG. 6 shows an example of a subframe structure in NR. The subframe structure of FIG. 6 may be used in a time division duplex (TDD) system of NR to minimize delay of data transmission. The subframe structure of FIG. 6 may be called a self-contained subframe.

Referring to FIG. 6, a $1^{st}$ symbol of a subframe includes a DL control channel, and a last symbol includes a UL control channel. $2^{nd}$ to $13^{th}$ symbols of the subframe may be used for DL data transmission, or may be used for UL data transmission. As such, if DL transmission and UL transmission are performed sequentially in one subframe, a UE may receive DL data and transmit UL HARQ-ACK in one subframe. As a result, a time required until data is retransmitted may be decreased when a data transmission error occurs, thereby minimizing delay of final data transfer. This subframe structure may require a gap for allowing a BS and a UE to transition from a transmission mode to a reception mode or transition from the reception mode to the transmission mode. To this end, in the subframe structure, some symbols at a time of switching from DL to UL may be configured as a guard period (GP).

In NR, a PDCCH may be configured of one or more CCEs. The PDCCH may be transmitted through a resource configured of 1, 2, 4, 8, or 16 CCEs. The CCE is configured of 6 REGs, and one REG is configured of one RB in a frequency domain and one OFDM symbol in a time domain.

In addition, in NR, a new unit called control resource set (CORESET) may be introduced. The UE may receive the PDCCH in the CORESET. The CORESET may include a UE-specific CORESET for transmitting UE-specific control information and a common CORESET for transmitting common control information to all UEs.

Figure 7:
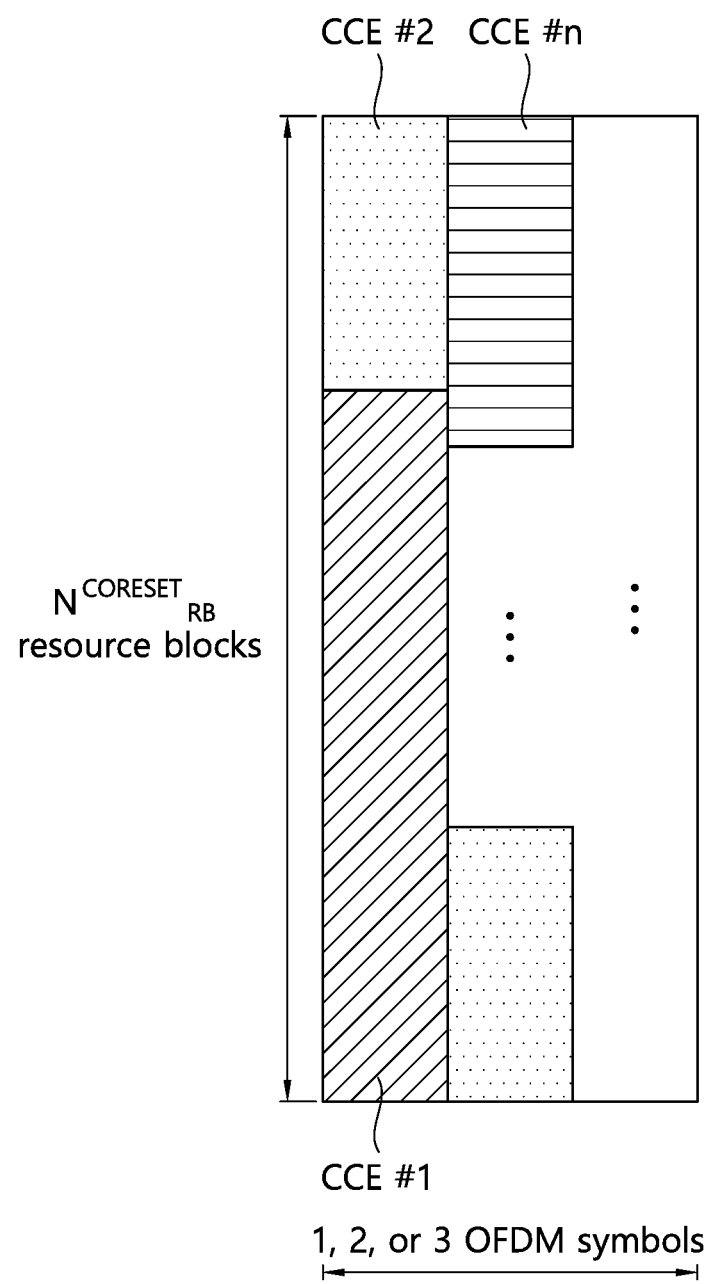
FIG. 7 shows an example of CORESET.

FIG. 7 shows an example of CORESET. Referring to FIG. 7, the CORESET may be configured of $NR_B^{CORESET}$ RBs in a frequency domain, and may be configured of $N_{symb}^{CORESET} \in \{1, 2, 3\}$ OFDM symbols in a time domain. $N_{RB}^{CORESET}$ and $N_{symb}^{CORESET}$ may be determined by a BS through a higher layer signal. As shown in FIG. 7, the CORESET may include a plurality of CCEs (or a plurality of REGs). A UE may attempt PDCCH detection in unit of 1, 2, 4, 8, or 16 CCEs in the CORESET. One or a plurality of CCEs capable of attempting PDCCH detection may be called a PDCCH candidate. The plurality of CORESETs may be configured in the UE.

A control region in the legacy LTE differs from that in NR as follows. The control region in the legacy LTE is configured across a full system band used by a BS. All UEs except for some UEs (e.g., an enhanced machine-type communication (eMTC) UE or a narrowband internet-of-things (NB-IoT)) supporting only a narrow band shall be able to receive a radio signal in the full system band of the BS to properly receive/decode control information transmitted by the BS. On the other hand, the CORESET introduced in NR may use only part of the system band instead of the full system band. The BS may allocate the CORESET to each UE, and may transmit control information through the allocated CORESET. That is, in NR, the UE may receive the control information transmitted by the BS even if the full system band is not received.

Multi-RAT dual connectivity will be described. NG-RAN supports multi-RAT dual connectivity configured so that a UE in the RRC_CONNECTED state with multiple RX/TX may use radio resources provided by two separate schedulers. Multi-RAT dual connectivity is generalization of the E-UTRA dual connectivity. Two separate schedulers are located at two different NG-RAN nodes connected to each other through a non-ideal backhaul. One of the two different NG-RAN nodes performs the role of a master node (MN), and the other one performs the role of a secondary node (SN). In other words, one scheduler is located at the MN while the other scheduler is located at the SN. The two different NG-RAN nodes provide either the E-UTRA connectivity (when the NG-RAN node is an ng-eNB) or NR connectivity (when the NG-RAN node is a gNB). The en-gNB is a node that provides the NR user plane and control plane protocol termination toward a UE and operates as an SN in the E-UTRAN-NR dual connectivity (EN-DC). The ng-eNB is a node that provides the E-UTRA user plane and control plane protocol termination toward a UE and is connected to 5G CN through an NG interface. The MN and SN are connected to each other through a network interface, and at least the MN is connected to the core network. Although multi-RAT dual connectivity in the present disclosure has been designed based on a non-ideal backhaul between different nodes, the multi-RAT dual connectivity may also be used for an ideal backhaul.

Figure 8:
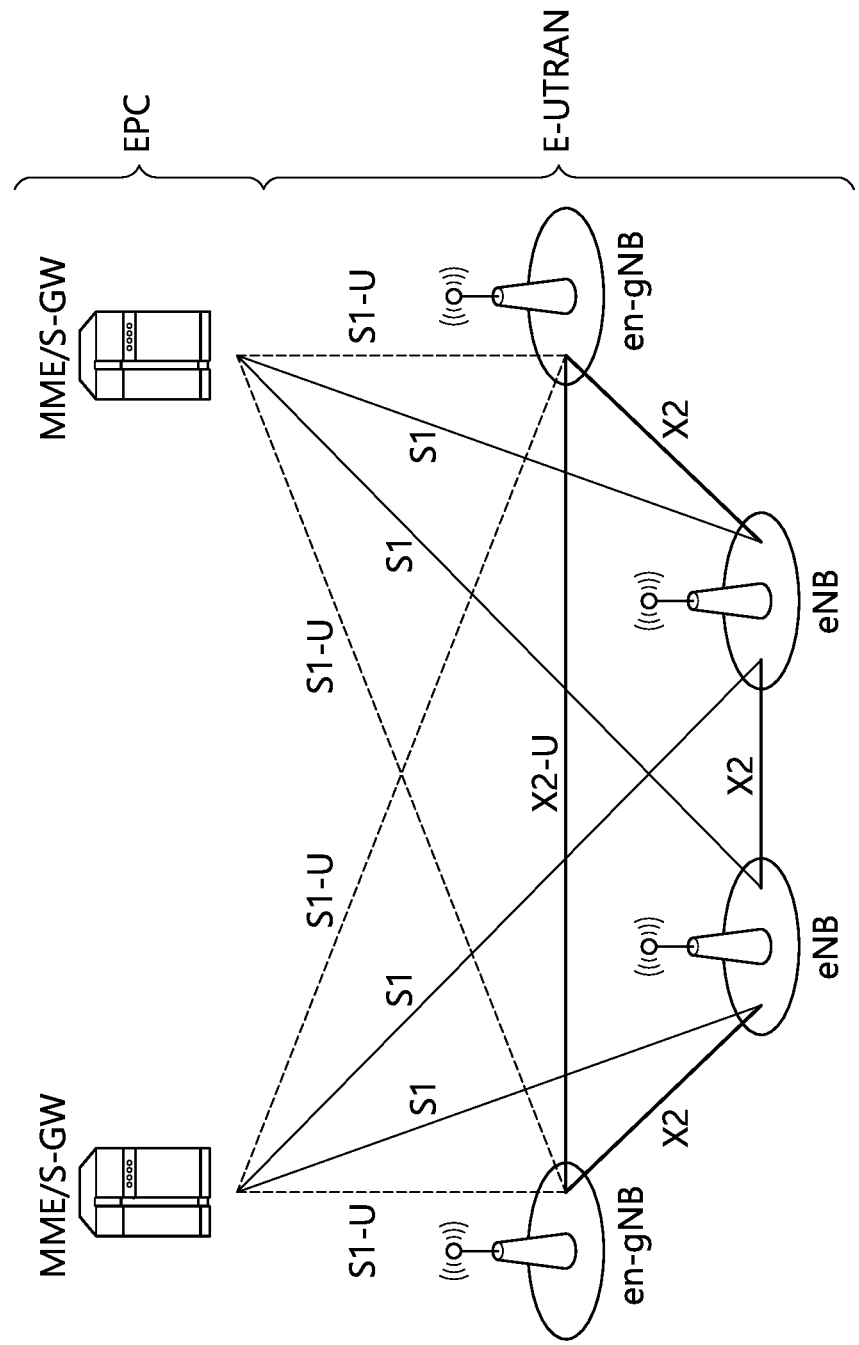
FIG. 8 shows EN-DC architecture.

FIG. 8 shows EN-DC architecture. The E-UTRAN supports multi-RAT dual connectivity through EN-DC, where a UE is connected to one eNB operating as an MN and one en-gNB operating as an SN. An eNB is connected to EPC through S1 interface and connected to en-gNB through X2 interface. The en-gNB may be connected to the EPC through S1-U interface and connected to a different en-gNB through X2-U interface.

The 5G CN also supports multi-RAT dual connectivity. An NG-RAN supports NG-RAN E-UTRA-NR dual connectivity (NGEN-DC), where a UE is connected to one ng-eNB operating as an MN and one gNB operating as an SN. The ng-eNB is connected to the 5G CN, and the gNB is connected to the ng-eNB through Xn interface. Also, the NG-RAN supports NR-E-UTRA dual connectivity (NE-DC), where a UE is connected to one gNB operating as an MN and one ng-eNB operating as an SN. The gNB is connected to the 5G CN, and ng-eNB is connected to the gNB through Xn interface.

As described above, a plurality of connections to different Tx/Rx points (TRPs) may be supported on the same frequency to obtain a spatial diversity, a transmission point diversity, or the like. Similarly to LTE, a dual connectivity may also be supported in NR. Hereinafter, the present disclosure describes a measurement procedure related to the dual connectivity and transmission/reception of a control signal/data when the dual connectivity is supported in NR.

1. Dual Connectivity in which Only Single Reception (RX) is Possible at a Given Time Due to a problem of intermodulation distortion (IMD) or UE capability or the like, a UE may perform only one UL transmission at a given time even if a dual connectivity is configured and UL is activated in both of two carrier groups (CGs). In this case, due to a characteristic of single RX, there may be a need to change a procedure of the dual connectivity in terms of initial access, HARQ-ACK transmission, sounding reference signal (SRS) transmission, or the like. The following scenario may be considered to deal with the necessity of single RX.

1) A UL resource is semi-statically split between CGs, and a payload is not mixed in each CG.

2) The UL resource is dynamically split between CGs, and the payload is not mixed in each CG.

3) The UL resource is dynamically split between CGs, and the payload may be mixed in each CG.

(1) Initial Access Procedure (i.e., Random Access (RACH)-Related Procedure)

First, an initial access procedure in a dual connectivity will be described according to an embodiment of the present disclosure. When a UE is connected to only one CG, it is not necessary to consider any time division multiplexing (TDM)-based multiplexing between UL transmissions to each CG. However, if an additional CG is configured by the dual connectivity, the initial access procedure may be considered as follows.

If the additional CG is configured and the UE supports only single RX at a given time, one CG may configure a set of UL subframes or UL slots that can be used by another CG. For example, an eNB of LTE may configure a set of UL slots that can be used based on NR. Alternatively, a gNB of NR may configure a set of UL slots that can be used based on LTE. That is, even before the additional CG is activated, semi-static split of a UL resource may be indicated. The configured semi-static UL resource may be used as a physical random access channel (PRACH) resource, a PUCCH/PUSCH resource, an SRS resource, or the like. When a timing advance (TA) is different between two CGs, a gap may be configured as a resource reserved for a UL resource allocated to an NR side. For example, if a TA of a first CG is k1 and a TA is k2 (k1>k2), and if a slot n is allocated to a second CG and a slot n+1 is allocated to the first CG, at least one last symbol of the slot n may be reserved to accommodate the TA of the first CG. A similar method may also be applied to a case of sharing a dynamic resource. In case of sharing the dynamic resource, at least one symbol may be configured as a potential reserved resource, and whether to reserve the resource may be dynamically indicated. Alternatively, if the UE needs to end transmission at the slot n to accommodate transmission at the slot n+1 having a different TA, the UE may perform puncturing according to an implementation of the UE. If the UE does not have to change the TA or does not require a gap, all resources may be used. If the gap is required, the UE may autonomously configure the gap by puncturing at least one symbol.

Alternatively, a PRACH or a Msg3 (i.e., RRC connection request message) of the RACH procedure may always be transmitted irrespective of semi-static UL resource split. Accordingly, a PRACH transmission opportunity may be guaranteed, and the RACH procedure may be improved. If a resource is allocated to a different CG, the UE may omit data transmission in the different CG. If transmission of a PRACH/Msg3 in one CG collides with transmission of a PRACH/Msg3 in a different CG, transmission of a master CG or first CG may be prioritized. In a similar manner, HARQ-ACK transmission corresponding to a Msg4 (i.e., collision resolution message) of the RACH procedure may also be prioritized over other transmissions. That is, in general, the semi-static UL resource split may be applied only to a data and SRS related procedure, and PRACH/Msg3 transmission and related HARQ-ACK feedback may be transmitted with a higher priority irrespective of the semi-static UL resource split.

According to the PRACH/Msg3 transmission and related HARQ-ACK feedback transmission, the omitted PUSCH/PUCCH may be immediately retransmitted when UL is available. In addition, to guarantee a PRACH transmission opportunity in NR, a resource may be configured in a last symbol (which may be an SRS symbol). To realize this, the semi-static UL resource split may not be configured between different CGs before the RACH procedure is not complete. However, the semi-static UL resource split may be configured between different CGs even before the RACH procedure is complete. The aforementioned method may be applied when there is switching between UL transmissions each having a different TA.

Alternatively, the PRACH or the Msg3 (i.e., RRC connection request message) of RACH procedure in LTE may always be transmitted irrespective of the semi-static UL resource split. On the other hand, the PRACH or the Msg3 of RACH procedure in NR may be transmitted when the resource is not used by UL transmission of LTE. In addition, a short period of the NR PRACH may be configured around at least one symbol of an LTE slot (e.g., at least one symbol every 0.5 ms), and when PRACH transmission of NR collides with UL transmission of LTE, at least PUSCH transmission of LTE may be punctured. In addition, transmission of an SRS of LTE may be omitted when collision occurs with PRACH transmission of NR. Regarding a PUCCH, PUCCH transmission of LTE cannot be omitted due to PRACH transmission of NR, or at least transmission of PUCCH format 1/1a/1b/3 of LTE may not be omitted. Another PUCCH transmission of LTE may be completely omitted when collision occurs with PRACH transmission of NR, or a symbol colliding with PRACH transmission of NR may be punctured. The aforementioned method may also be applied between LTE channel transmission and NR SRS transmission. That is, the LTE channel transmission may be punctured in a symbol in which collision occurs with the NR SRS transmission.

(2) HARQ-ACK Transmission

In LTE, an HARQ-ACK transmission timing is fixed. HARQ-ACK transmission of NR may be based on a UL resource adjusted between CGs. However, in LTE, there may be a need to transmit data potentially causing HARQ-ACK transmission in one of UL resources adjusted for a CG of NR.

DL transmission causing HARQ-ACK transmission may not be allowed in an unallocated UL resource (if semi-static UL resource split is configured). In this case, a UE may process DL reception, but does not transmit any HARQ-ACK feedback. A network which fails to receive HARQ-ACK feedback for DL transmission may not perform retransmission. Alternatively, the HARQ-ACK feedback may be transmitted only when a semi-statically split UL resource is not used in an NR side. That is, if a priority is allocated to each CG in each slot or each resource due to the semi-static UL resource split and if a corresponding slot or resource is not used by a CG with priority (a first CG), the corresponding slot or resource may be used by a CG without priority (a second CG). In this case, if transmission of the second CG is performed across one or more slots of transmission of the first CG, a corresponding slot or resource may be used by the second CG only when all resources of the first CG are not used by the first CG.

That is, if the semi-static UL resource split is configured, the first CG with priority may be defined for each UL resource. In addition, the first CG may not be defined for a specific set of UL resources. In this case, a master cell group (MCG) may have a higher priority, or each CG may have the same priority on the basis of a channel to be transmitted. When a resource of the first CG is not used by the first CG, the resource may be used by the second CG. In order for the second CG to use a resource, all resources shall not be used by the first CG (or only some resources may be used by the second CG). This may be applied not only to HARQ-ACK transmission but also to another uplink control information (UCI)/data/SRS transmission. That is, the aforementioned method may be generally applied to all UL transmissions.

Upon determining whether UL transmission exists in a current slot n of the first CG, there is a need to consider a processing time, numerologies different from one another, TTI, or the like. For example, when a CG of LTE intends to use a current subframe, UL scheduling may occur in the middle of a subframe according to a numerology (e.g., 60 kHz) used in an NR CG. For another example, when the NR CG intends to use the current slot, LTE may schedule UL transmission based on short TTI. In addition, when a self-contained subframe is considered, UL transmission may always occur. In this case, it is not easy to surely determine whether a specific subframe or slot is used by the first CG. To solve this problem, even if the second CG initiates UL transmission, a resource for transmission of the second CG may be punctured, upon detecting UL transmission of the first CG during transmission.

The aforementioned method may also be equally applied to NR-NR DC/CA without losing generality.

Alternatively, all channels of two CGs may be transmitted in one UL carrier. For example, when a UE can simultaneously transmit a PUCCH/PUSCH in one CG, a PUCCH of one CG and a PUSCH of a different CG may be simultaneously transmitted. In addition, the PUSCH of the different CG may be transmitted together with UCI (or the UCI may be transmitted on a PUCCH format similar to that of the PUSCH). Resource allocation for the PUSCH of the different CG may be semi-statically configured or may be dynamically allocated through DCI. For example, if PUCCH transmission of an LTE CG and PUCCH or PUSCH transmission of an NR CG collide on the same resource, the following cases may be considered.

1) A case where PUCCH/PUSCH simultaneous transmission is possible in an LTE UL carrier.

In case of PUCCH transmission of LTE, a PUCCH of NR may be transmitted through a UL spectrum of LTE. A PUSCH of NR may be transmitted on a PUCCH format similar to that of a PUSCH of LTE. To this end, at least one NR PUCCH format may be based on a PUSCH structure. Resource allocation for this may be semi-statically configured or may be dynamically allocated through DCI.

When PUSCH transmission of LTE collides with respect to a UL channel of NR, if the UE supports a multi-cluster PUSCH, the UE may transmit the PUSCH of LTE and the PUSCH of NR by using the multi-cluster PUSCH. To this end, even if the multi-cluster PUSCH is configured, each CG may not schedule multi-cluster scheduling alone. Resource allocation for another CG may be semi-statically configured or may be dynamically allocated through DCI. Alternatively, the UE may piggyback UCI of NR on the PUSCH of LTE by using a different mapping. The UCI piggyback may be performed by puncturing the PUSCH of LTE.

2) Alternatively, the UE may always perform PUCCH/PUSCH simultaneous transmission, and multi-cluster transmission may be configured in each CG. In this case, the following operation may be considered.

When PUCCH transmission of LTE and PUCCH transmission of NR occur in any subframe, the UE may transmit the PUCCH of LTE and the PUCCH of NR together. It may be transmitted on a PUCCH format similar to that of the PUSCH of LTE. Alternatively, a carrier in which the PUCCH is scheduled may be used as a transmission carrier. In this case, if both of two CGs have PUCCH transmission, an MCG may be selected and used. A PUCCH format of NR may be based on an RAT type of a UL carrier in terms of a duration, a start symbol, a numerology, or the like. That is, an LTE format may be used upon selecting a UL carrier of LTE. In addition, to deal with different TTI durations, a short TTI of LTE may be used when the UE supports the short TTI. For example, if a UL carrier of NR uses a subcarrier spacing of 30 kHz and a UL carrier of LTE uses a subcarrier spacing of 15 kHz, UL transmission of NR may be performed through a short TTI of one slot in the UL carrier of LTE.

When PUSCH transmission of LTE and PUCCH transmission of NR occur in any subframe, the PUSCH of LTE may be transmitted in a UL carrier of NR. If a short PUCCH is used in NR, the PUSCH of LTE and the PUCCH of NR may be multiplexed in a TDM manner. The PUSCH of LTE may carry UCI of NR. In this case, only the PUSCH may be transmitted in LTE. In addition, if the PUSCH of LTE piggybacks UCI of LTE, UL transmission in LTE may be performed through a multi-cluster PUSCH using an NR PUCCH format similar to that of the PUSCH.

When PUSCH transmission of LTE and PUSCH transmission of NR occur in any subframe, the PUSCH of LTE and the PUSCH of NR may be both transmitted in a UL carrier of LTE by using the multi-cluster PUSCH transmission. As described above, a short TTI of LTE may be used to process different numerologies.

Meanwhile, to protect the SRS transmission of LTE, the PUCCH/PUSCH of NR may be transmitted with a format of being punctured. Alternatively, a SRS resource of LTE (i.e., an SRS resource configured cell-specifically) may be reserved for UL transmission of NR.

Alternatively, a DC including UL sharing may be activated.

Figure 9:
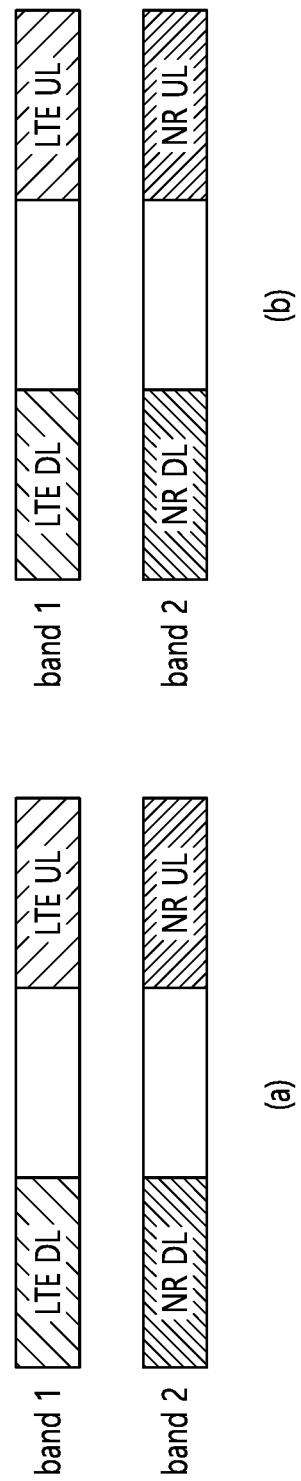
FIG. 9 shows a DC including UL sharing according to an embodiment of the present disclosure.

FIG. 9 shows a DC including UL sharing according to an embodiment of the present disclosure. FIG. 9-(a) shows a normal DC between LTE and NR. A DL carrier and UL carrier of LTE exist in a band 1, and a DL carrier and UL carrier of NR exist in a band 2. The DL carrier and UL carrier of LTE constitute a paired spectrum, and the DL carrier and UL carrier of NR also constitute a paired spectrum. FIG. 9-(b) shows a DC including UL sharing. Instead of using an NR UL carrier paired with an NR DL carrier, an LTE UL carrier is used for NR UL transmission.

Meanwhile, for a non-standalone (NSA) operation of NR, only one UL carrier may be activated at a given time. To support this, the following aspects may be considered.

1) A UL resource may be semi-statically split between LTE and NR, and UL transmission in each RAT may occur only in each allocated UL resource.

2) The UL resource may be dynamically used between LTE and NR, based on a UCI type and/or a CG-based priority and scheduling. Alternatively, which UL resource will be accommodated by each UE resource may be dynamically selected. The UCI type and/or the CG-based priority may be necessary to avoid potential collision. This is because it is not easy to prevent collision caused by scheduling, since each CG has a different processing time.

3) An LTE-NR DC may be processed similarly to carrier aggregation (CA). That is, UCI and data may be aggregated between two CGs.

The semi-static UL resource split will be described in greater detail. An easiest way to activate only one UL carrier at a time is to semi-statically split a UL resource between LTE and NR. Since LTE requires UL transmission based on a subframe, some sets of subframes may be allocated to NR, and the remaining subframes may be allocated to LTE. If UL transmission of LTE such as a PUCCH, a PUSCH, or the like is scheduled in the subframe allocated to NR, a UE may omit UL transmission of LTE irrespective of whether UL transmission of NR exists in a corresponding subframe. To minimize the omission, a reference HARQ timing may be configured. For example, in FDD, an HARQ timing of FDD-TDD CA may be used for a case where a primary cell (PCell) is TDD, and the same UL subframe as in a TDD DL/UL configuration may be selected. For example, if a UL subframe 2/3/4/7/8/9 is allocated to LTE, a TDD DL/UL configuration 0 may be used for the HARQ-ACK timing. Regarding the PUSCH, a normal HARQ-ACK timing may be used for a case where scheduling can avoid collision. That is, even in case of a single carrier, DL may be regarded as an FDD carrier and UL may be regarded as a TDD carrier, in terms of an HARQ-ACK operation.

When a TDD carrier of LTE and an FDD carrier of NR are connected through a DC, UL transmission of NR may be limited to a subframe without UL transmission of LTE. When the TDD carrier of LTE and the TDD carrier of NR are connected through the DC, overlapping of UL transmission of NR and UL transmission of LTE may be minimized by shifting a frame boundary of NR.

The aforementioned operation may be configured by a network when the DC is configured. If the UL carrier of LTE and the UL carrier of NR are shared, an operation for processing different RAT payloads may be necessary. In addition, a specific mechanism may be configured by a higher layer, and the UE may perform different operations according to configurations. In addition, HARQ-ACK may be piggybacked on transmission of a different CG. The piggyback may be based on an RAT type of the different CG.

(3) Data Transmission Including Semi-Persistent Scheduling (SPS)

For data scheduling, real-time or semi-static adjustment may be required between CGs. Accordingly, data transmission may be multiplexed in a TDM manner. To minimize the adjustment, a payload of each CG may be encapsulated by being aggregated as if it is single UL transmission. An RAT type of the payload combined in this manner may be defined as follows.

It may always be based on an RAT type of MCG.

It may be based on an RAT type of a first CG for an allocated UL resource, based on the semi-static UL resource split. In the absence of the first CG allocated to the UL resource, it may be based on the RAT type of MCG.

It may always be based on an RAT type of NR.

It may be based on an RAT type of SRS. That is, data transmission may be based on LTE if a current UL resource is used for transmission of SRS of LTE, and data transmission may be based on NR if the current UL resource is used for transmission of SRS of NR.

Based on the RAT type, resources and transmission parameters may be based on respective RAT types.

Similarly, when a media access control (MAC) is shared between two CGs, a MAC procedure/protocol (e.g., RAT type) may also be determined as follows.

It may always be based on the RAT type of MCG.

It may be based on an RAT type of a first CG for an allocated UL resource, based on the semi-static UL resource split. In the absence of the first CG allocated to the UL resource, it may be based on the RAT type of the MCG.

It may always be based on an RAT type of NR.

The RAT type may be allocated for each bearer, and only the allocated RAT type may be used for given bearer transmission. For example, LTE and NR may be both configured for one bearer. In this case, data from the bearer may be transmitted through both LTE and NR. If only LTE is configured for one bearer, data from the bear may be transmitted only through NR.

In the maintaining of a timer or the like, an independent timer may be used between CGs.

(4) SRS Transmission

A method similar to the aforementioned UCI/data transmission may also be applied to SRS transmission. However, SRS transmission may be omitted to give way resources to UCI or data transmission of a different CG. For example, if only SRS is transmitted through a UL resource of a first CG and if data and/or UCI are transmitted in a different CG, a UE may omit SRS transmission to transmit the different CG. When MAC is shared between the two CGs, even if there is no data and/or UCI transmission in the first CG, data and/or UCI may be transmitted in the first CG. That is, the SRS cannot be detoured via the different CG, and may be transmitted only as it is configured. On the other hand, if the MAC is shared, the data and/or the UCI may be detoured via the different CG. If the data and/or the UCI are detoured to deal with collision of UL transmission between the two CGs, this may be first attempted. If there is no collision after adjustment, UL transmission may be complete. In addition, if there is collision between the two CGs, the SRS may have a lower priority, and if UL transmission of the different CG can be complete by not transmitting the SRS, SRS transmission may be omitted for UL transmission of the different CG.

Alternatively, an SRS resource of each RAT type may be semi-statically configured, and UL transmission of each RAT may be rate-matched or punctured around the configured SRS resource. In terms of LTE, a semi-statically configured cell-specific SRS resource may be rate-matched or punctured by UL transmission of NR. In terms of NR, the semi-statically configured SRS resource may be regarded as a resource reserved for UL transmission of LTE/NR. In order not to change an operation of LTE, an SRS resource of NR may be configured to be aligned with a cell-specifically configured SRS resource of LTE. In addition, for an aperiodic SRS resource of NR, an aperiodic SRS of one CG may be omitted when a UE performs UL transmission in a different CG. For effective sharing, a dynamic indication of an HARQ-ACK timing and PUSCH transmission timing may also be supported in LTE.

Meanwhile, when only one UL carrier is activated at a time in an NSA operation, the following DC scenario may be considered.

Figure 10:
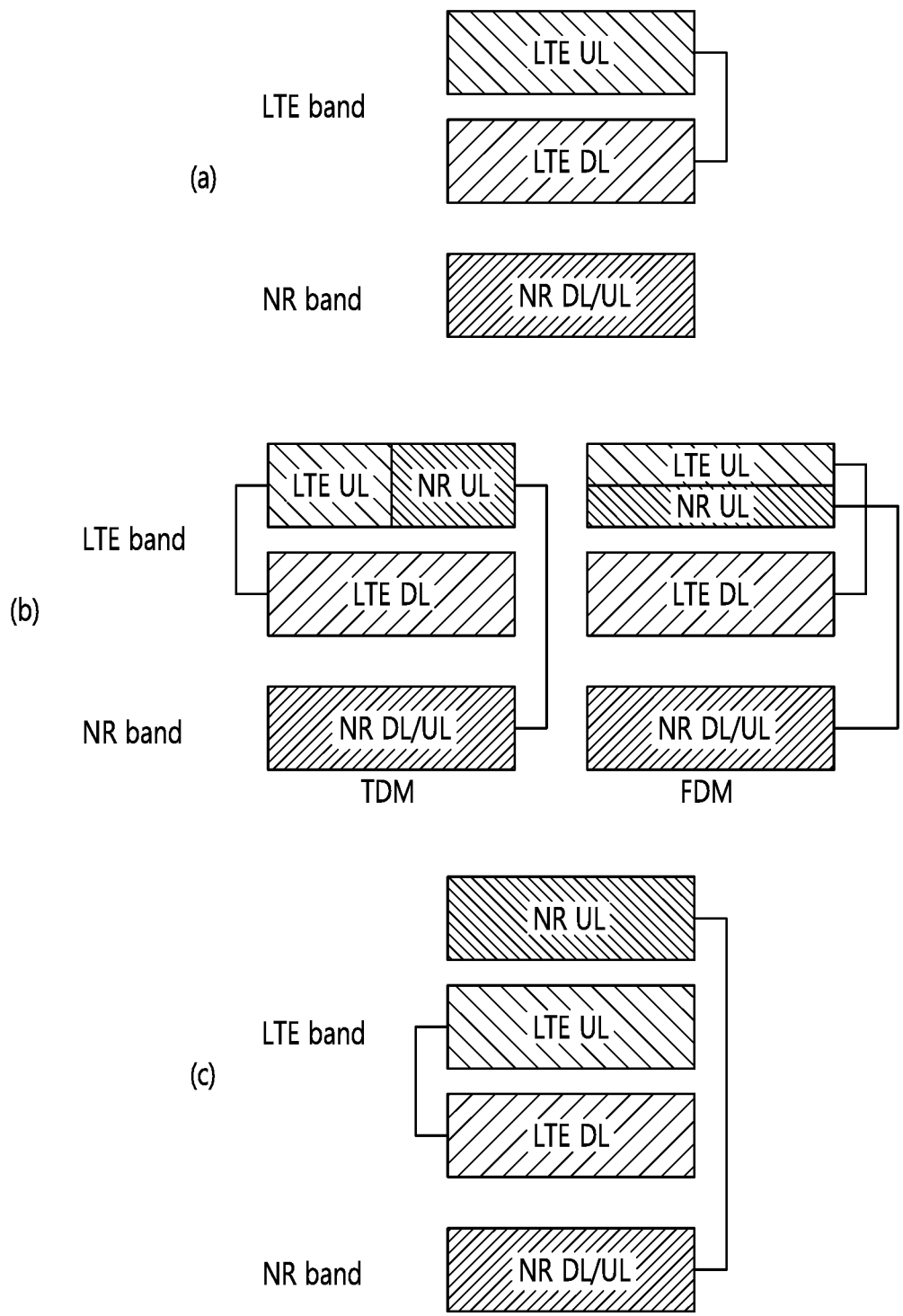
FIG. 10 shows a DC scenario for single UL transmission according to an embodiment of the present disclosure.

FIG. 10 shows a DC scenario for single UL transmission according to an embodiment of the present disclosure. FIG. 10-(a) is a typical DC scenario. A UL carrier and a DL carrier, which have different frequencies, exist in an LTE band (i.e., FDD), and DL/UL transmission of NR is performed in an NR carrier of an NR band (i.e., TDD). FIG. 10-(b) is a DC scenario including UL sharing with a UL (supplemental UL (SUL)) carrier. That is, NR shares an LTE UL carrier with LTE as an NR SUL carrier. Within the UL carrier of LTE, UL transmission of LTE and UL transmission of NR may be multiplexed in an FDM or TDM manner. FIG. 10-(c) is a DC scenario including an SUL carrier. That is, NR uses an additional UL carrier of LTE as an SUL carrier of NR.

Hereinafter, for each DC scenario described in FIG. 10, a UE operation related to activation of a single UL carrier will be described.

1) Scenario 1: Typical DC Scenario of FIG. 10-(a)

In this case, an FDD carrier of LTE and a TDD carrier of NR may be dual-connected, or a FDD carrier of LTE and an FDD carrier of NR (including an FDD operation similar to TDD such as partial data/short PUCCH transmission) may be dual-connected.

Figure 11:
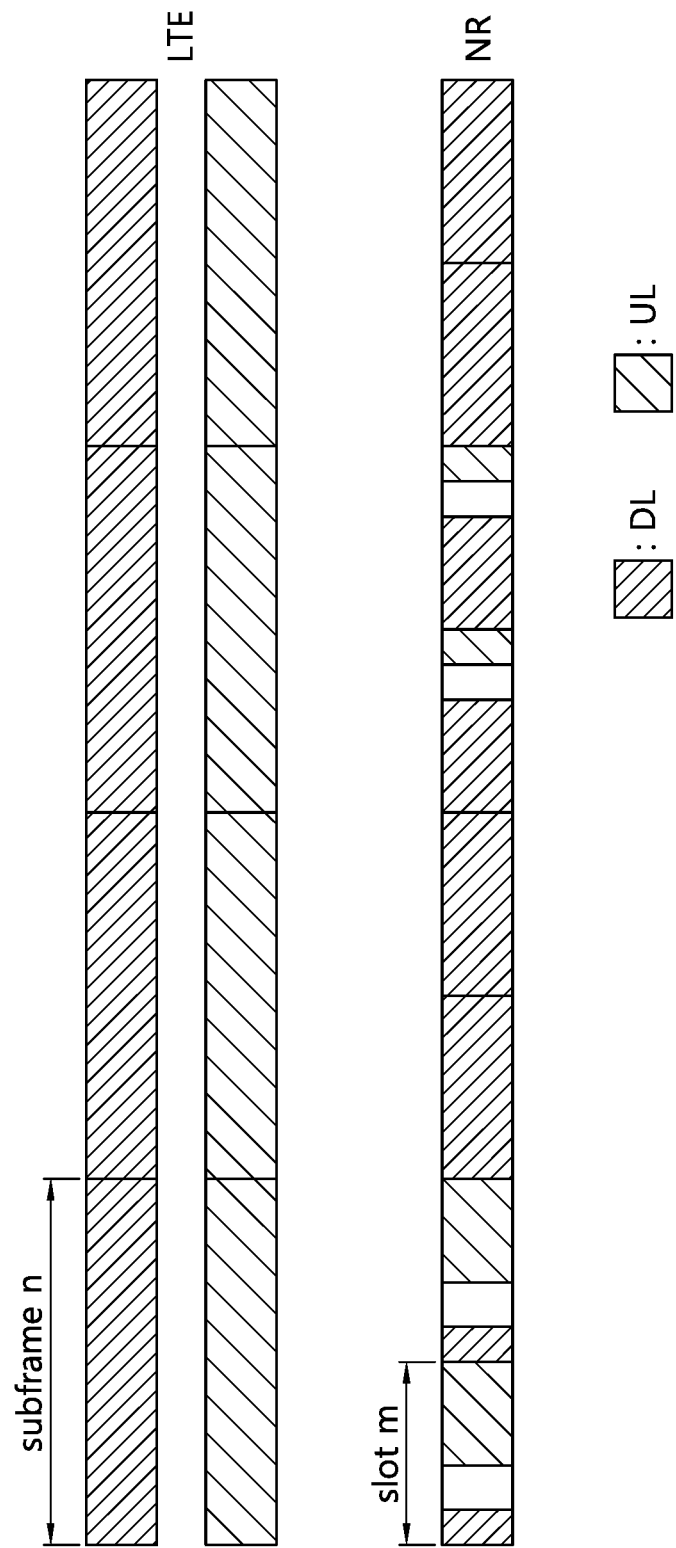
FIG. 11 shows UL transmission based on a dual connectivity of LTE and NR according to an embodiment of the present disclosure.

FIG. 11 shows UL transmission based on a dual connectivity of LTE and NR according to an embodiment of the present disclosure. When a CG of NR uses a TDD operation of a DL-based or UL-based slot structure and different numerologies can be used between two CGs, only some resources of a subframe are necessary for NR UL transmission. If a subframe/slot structure of LTE/NR of FIG. 11 is used, for UL transmission of NR in a slot m, the entire subframe n may not be used for UL transmission of LTE. In particular, in slots m+4 and m+5, although only a very small portion is required for UL transmission of NR, the entire subframe may not be used for UL transmission of LTE.

Figure 12:
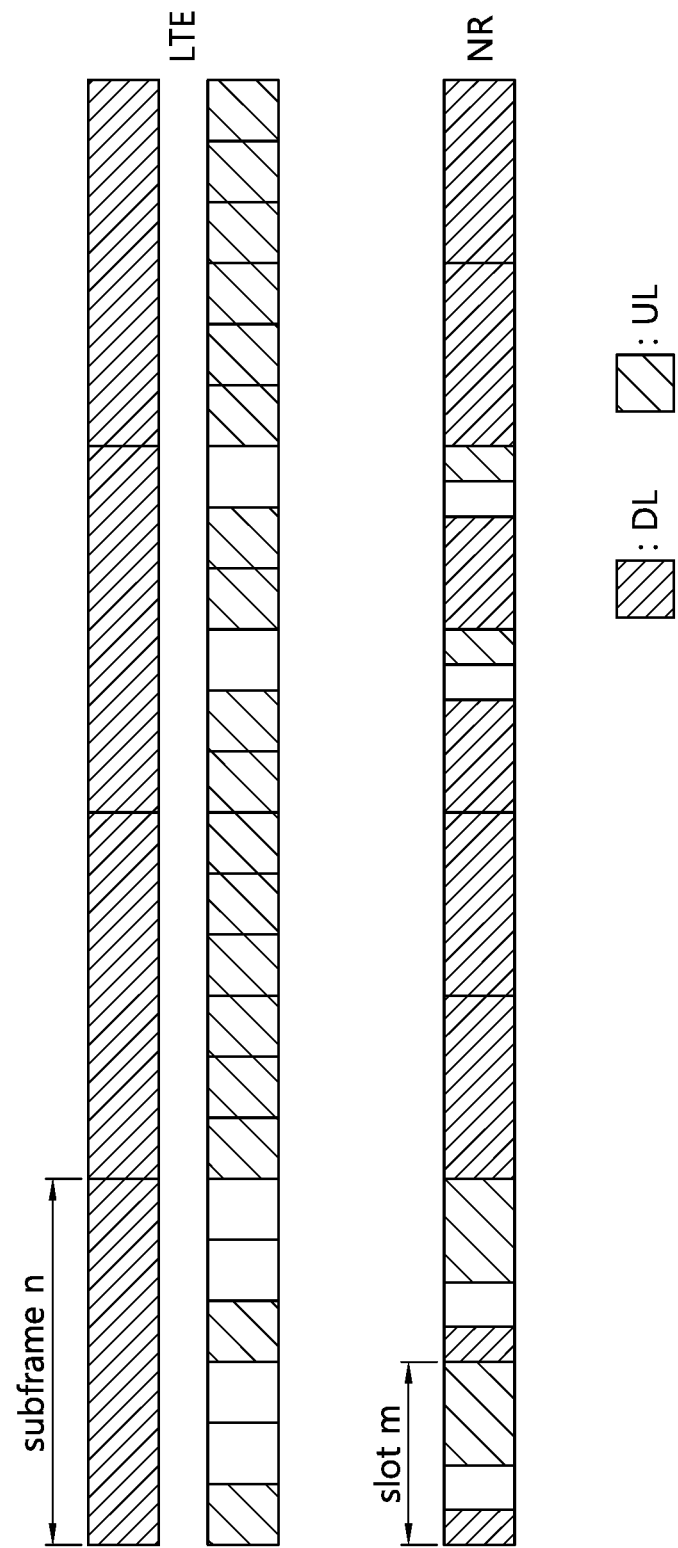
FIG. 12 shows UL transmission based on a dual connectivity of LTE and NR according to another embodiment of the present disclosure.

FIG. 12 shows UL transmission based on a dual connectivity of LTE and NR according to another embodiment of the present disclosure. To solve the above problem, in LTE, a short TTI operation is applied, and short TTI-based UL transmission may also be performed in a subframe in which UL transmission of NR overlaps. That is, a UL resource split between LTE and NR may be performed not in a subframe level but in a short TTI level of LTE. Referring to FIG. 12, UL transmission of LTE may be scheduled based on a short TTI (e.g., 2 symbols), and the UL resource split between LTE and NR may also be performed based on the short TTI. Accordingly, in slots m+4 and m+5, the entire subframe cannot be used for UL transmission of LTE. Instead, only UL transmission in a short TTI overlapping with UL transmission of NR may not be performed.

To support this, a CG of NR may report information on a slot structure intended by itself to a CG of LTE. Accordingly, the CG of LTE may split a UL resource between CGs. UL transmission may be scheduled and performed according to semi-static or dynamic UL resource sharing based on a split UL resource.

In summary, if TDM is considered between the LTE CG and the NR CG, an operation based on a short TTI may be used. The UL resource split based on the short TTI may be used particularly when the NR introduces an operation similar to TDD with a DL/UL-based slot. Even if the NR uses FDD, a frame structure may use a partial DL and a partial UL similarly to TDD (in particular, in case of half-duplex (HD) FDD). Therefore, there is a need to allow UL resource sharing based on the short TTI between LTE and NR.

2-1) Scenario 2-1: DC Scenario Including UL Sharing Through TDM of FIG. 10-(b)

Since a UL carrier is shared between LTE and NR, the same numerology for UL transmission may be considered. In this case, the UL resource split may be preferably performed in a subframe level. To minimize an influence in terms of LTE, similarly to a case where a TDD PCell and an FDD DL only secondary cell (SCell) are aggregated through CA, an FDD-TDD CA framework may be directly used in LTE.

In addition, since a UL resource of LTE and a UL resource of NR are multiplexed in a TDM manner, there is a need to consider PRACH transmission. In order not to have effect on RACH transmission, RACH-related UL transmission may have a higher priority than different UL transmissions. That is, PRACH/Msg3 transmission may always be transmitted irrespective of the UL resource split.

2-2) Scenario 2-2: DC Scenario Including UL Sharing Through FDM of FIG. 10-(b)

When a UL resource of LTE and a UL resource of NR are multiplexed in an FDM manner, it may be treated similarly to continuous UL CAs within a band.

3) Scenario 3: DC Scenario Including an SUL Carrier of FIG. 10-(c)

In terms of resource alignment and HARQ-ACK/PUSCH transmission timing, it may be treated similarly to the aforementioned scenario 2-1.

A UE operation related to a short TTI will be described in greater detail. Irrespective of a duplex mode used in LTE/NR, the following aspects may be considered for the short TTI. This is to more effectively process the short TTI in terms of LTE when semi-static TDM-based multiplexing is used between UL transmission of LTE and UL transmission of NR. Meanwhile, a normal TTI and the short TTI may be both processed by scheduling. The following aspects may be applied when a TDM pattern is indicated to the UE in terms of LTE.

1) A set of subframes used for PUCCH/PUSCH transmission of LTE may be indicated as one of TDD DL/UL configurations. In terms of PUCCH transmission, PUSCH and HARQ-ACK timing may be based on the configured TDD DL/UL configuration. A set of short TTIs in a configured UL subframe based on the TDD DL/UL configuration may be regarded as a UL resource that can be used for the short TTI. In addition, a set of short TTIs may be configured within a configured DL subframe based on the TDD DL/UL configuration, and this may be used for a short TTI of LTE. A short TTI timing may be directly based on the conventional timing. For example, in case of FDD, n+k may be used (where k is a constant). That is, if there is no corresponding UL resource of a short TTI, the UE may not expect DL transmission of a UL grant. Alternatively, a new timing may be defined. A short PUCCH or a short PUSCH may be transmitted through a resource of a short TTI that can be first used after n+k according to the conventional timing.

2) A set of short TTIs may be separately indicated to be used potentially for a short TTI operation. For example, a UL resource of one short TTI may be configured for each subframe, and a DL resource of 6 short TTIs (when the short TTI has a length of 2 symbols) or a DL resource of two short TTIs (when the short TTI consists of 7 symbols) may be mapped to a UL resource of at least one short TTI every 1 ms. A timing may be based on a timing of the conventional short TTI, or a new timing may be defined. A short PUCCH or a short PUSCH may be transmitted through a UL resource of a short TTI that can be first used after n+k according to the conventional time. If a start symbol and duration are not indicated dynamically for the PUSCH, the UE may assume that the start symbol is a next symbol of a resource for a short TTI. Alternatively, a dynamic indication may be supported to dynamically indicate exclusion or reuse of a resource allocated to the short TTI of LTE for NR UL transmission.

On the other hand, a method similar to the aforementioned method may also be applied to a case where a DL carrier and a UL carrier are multiplexed in a TDM manner.

In general, in order to support a short TTI operation of single transmission in terms of LTE, the following aspects may be considered. When a TDD DL/UL configuration is indicated to the UE for the conventional PUSCH/PUCCH transmission, only a UL resource allocated to LTE may be used for the short TTI operation. In addition, a short TTI timing may be maintained. That is, a short PUCCH may be transmitted after n+k (according to a length of the short TTI, k=4 or 6 in FDD or other values in TDD). When the length of the short TTI is 7 symbols, there is no HARQ-ACK table in case of FDD-TDD CA. Therefore, in the short TTI, a DL resource not associated with UL may not be used for short PDSCH or short PUSCH transmission. It may include SPS.

Alternatively, a new timing may be considered. When LTE is configured with TDD DL/UL based on an HARQ-ACK timing, only a short TTI of 7 symbols may be supported. The HARQ-ACK table for the case of FDD-TDD CA may be extended to all DL subframes together with a default configuration. Alternatively, for the new timing, a short TTI of 2 symbols or 7 symbols may be supported. The short TTI of 7 symbols may be based on the aforementioned method, and a new timing for the short TTI of 2 symbols may be newly generated based on the HARQ-ACK timing table for the case of FDD-TDD CA. Alternatively, when both of the short TTI of 2 symbols and the short TTI of 7 symbols have new timings and there is no UL resource of a corresponding short TTI for short PUCCH transmission or short PUSCH transmission, a UL resource of a first available short TTI may be used.

Scheduling to the UE may be restricted in case of using TDM-based multiplexing between a DL carrier and UL carrier of LTE. When CA is configured for the UE, the number of HARQ-ACK bits may be decreased by indicating a TDM pattern for DL. That is, the UE may exclude an HARQ-ACK bit for a DL subframe excluded in use due to an interference issue. A corresponding frame of each carrier may be excluded in calculation of the HARQ-ACK bit, which may result in a decrease in a total size of the HARQ-ACK bit.

Single UL transmission will be described when dynamic UL resource sharing is performed. Irrespective of whether a UL resource is semi-statically split, the UE may perform UL transmission on the basis of scheduling and configurations. If an eNB and a gNB coexist or are connected through an ideal backhaul, it may be considered to share a UL resource by splitting it dynamically, rather than semi-statically splitting the UL resource. When the dynamic UL resource split/sharing is used, the following aspects may be considered in terms of resource utilization.

1) First scheduled transmission may always has priority. When the UE is scheduled for UL transmission, previously scheduled UL transmission cannot be omitted according to UL transmission scheduled later. In this case, irrespective of whether it is urgent, a CG having a short processing time cannot bring a resource from another CG. In addition, the priority may not be applied between CGs, and may be applied only between channels in the CG.

2) When collision occurs between different channels, the priority may be determined based on a UCI type and/or a CG. Transmission of a channel having a lower priority may be omitted/interrupted. Transmission of a channel which is already being transmitted may not be omitted/interrupted. However, this method may be ineffective when the eNB and the gNB are connected through a non-ideal backhaul since the eNB and the gNB cannot know which one is selected by the UE.

3) A resource may be split between two CGs, and a CG in an allocated resource may have a higher priority. If collision occurs, a channel of a first CG may have priority. That is, a resource not used in the first CG may be used by a second CG. This method may be applied when the eNB and the gNB are connected through the non-ideal backhaul, and scheduling on at least the allocated resource may be guaranteed.

In consideration of various matters, a set of UL resources allocated for UL transmission of NR may be indicated to the UE, and UL transmission of LTE may have priority in the remaining UL resources. When the resource is allocated to a CG, a corresponding CG may be defined as the first CG in a given UL resource. In addition, if two channels collide with each other in the given UL resource, the channel of the first CG may have priority.

2. DC for Sharing UL Spectrum Between CGs

Figure 13:
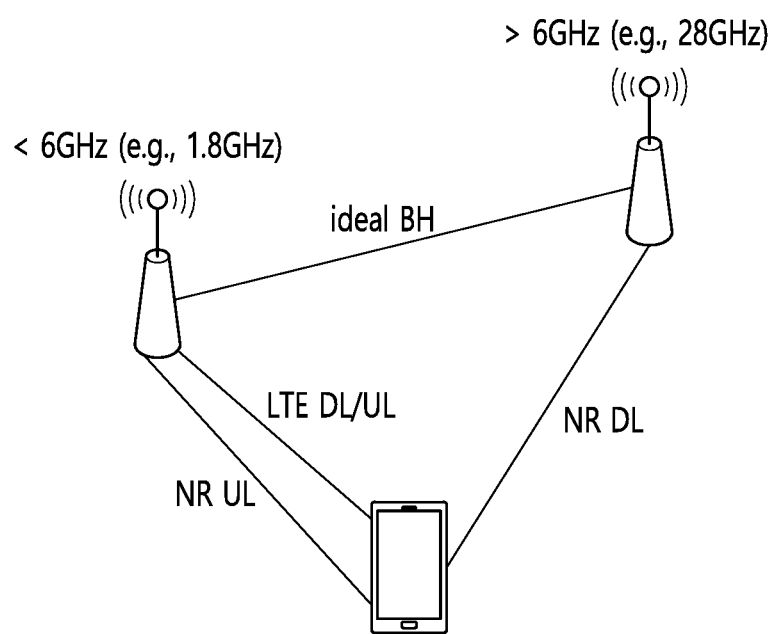
FIG. 13 shows a DC scenario for sharing a UL spectrum according to an embodiment of the present disclosure.

FIG. 13 shows a DC scenario for sharing a UL spectrum according to an embodiment of the present disclosure. Referring to FIG. 13, a DL carrier of NR is located at a band (e.g., 28 GHz) above 6 GHz, and a UL carrier of NR is located at a band (e.g., 1.8 GHz) below 6 GHz. That is, the DL carrier and UL carrier of NR are located at different bands. In addition, the UL carrier of NR share the same spectrum as a UL carrier of LTE. UL sharing may be based on any one of FDM and TDM schemes. In addition, when the UE is connected with the DL/UL carriers of NR at different frequency bands, if the UE is additionally connected to LTE through a DC, there is need to consider an additional issue such as timing advance (TA) alignment, wavelength alignment, or the like.

If LTE and NR are multiplexed in an FDM manner, the UL carrier of LTE and the UL carrier of NR may be subjected to carrier aggregation in a band. When LTE and NR are multiplexed in a TDM manner, a method described in the section "1. Dual connectivity in which only single reception (RX) is possible at a given time" may be applied.

It may be considered to share the UL resource in the TDM manner due to not only a UE capability and limitation but also a UE power problem or the like in coverage in which simultaneous UL transmissions of two RAT types are not effective. However, the sharing of the UL resource in the TDM manner may be applied only for a specific channel such as a specific PUCCH format or UCI or the like. That is, when one CG needs to transmit a PUCCH or a PUSCH having UCI, TDM-based multiplexing may be considered, whereas FDM-based multiplexing may be considered for typical data and SRS transmission. That is, a limitation of multiplexing may be applied to a set of specific channels or a specific UCI type, or may whole depend on network scheduling.

When a UL carrier of LTE and a UL carrier of NR are multiplexed in an FDM manner in the same UL spectrum, the following two cases may be considered.

1) The UL carrier of LTE and the UL carrier of NR do not overlap. That is, full FDM is possible between the UL carrier of LTE and the UL carrier of NR. However, to support this, a DL carrier identical to the UL carrier in terms of LTE may be required. This may restrict a DL carrier bandwidth in terms of LTE.

2) The UL carrier of NR may be located within a UL carrier/spectrum of LTE. That is, the UL carrier of NR may partially or fully overlap with the UL carrier/spectrum of LTE. In order not to interfere with PUCCH transmission of LTE, the UL carrier of NR may be defined by avoiding a boundary portion in the UL carrier of LTE. If the UL carrier of NR is located within the UL carrier/spectrum of LTE, a bandwidth of the UL carrier of NR may be the same as a bandwidth of the UL carrier of LTE, and UL transmission of NR (e.g., PUCCH/PUSCH) may be dynamically scheduled by scheduling and/or configurations within the UL carrier of NR. Alternatively, a specific frequency domain may be semi-statically allocated with the UL resource of NR.

(1) TA Processing

Irrespective of a DL spectrum, a TA shall be aligned such that a timing difference between LTE/NR is maintained to be less than or equal to a specific value. Since a DL timing may be different in LTE/NR, the following aspects may be considered to solve this problem.

If the same frequency is configured in LTE/NR and if only NR is configured in a UL spectrum with respect to different DL spectra, the UE may apply TA on the basis of only a DL timing of LTE. In this case, an RACH procedure may not be supported for an NR CG. That is, when such an operation is configured, the UE may not perform the RACH procedure towards an NR cell. In addition, in terms of the DL timing, the UE may use the DL timing of LTE as a criterion for applying the TA, while maintaining a timing in LTE/NR.

The UE may individually apply the TA for each cell, based on a TA adjustment between LTE/NR. For example, a timing offset between LTE and NR may be measured by a network, and may be adjusted when the TA is indicated by the NR cell.

The network may determine which method will be applied.

If a UL carrier/frequency of the UE is reconfigured and if LTE and NR coexist on the same UL frequency, a common channel between LTE/NR may be assumed. That is, an individual RACH procedure in terms of NR may not be performed.

(2) Waveform Processing

Whenever simultaneous UL transmission of LTE and NR occurs, a waveform of LTE (e.g., discrete Fourier transform spread (DFT-s)-OFDM) may be used. This may be applied when a common channel between LTE/NR is assumed. Otherwise, NR may use a semi-statically or dynamically configured waveform. In addition, if simultaneous UL transmission of LTE and NR occurs, the following procedure may be considered to reduce a peak-to-average power ratio (PAPR).

Simultaneous transmission of LTE PUCCH/NR PUCCH: A position of the NR PUCCH may be shifted by K PRBs. In addition, frequency hopping may be aligned to the PUCCH of LTE. K may be configured by a higher layer, or may be autonomously determined by a UE. This is to allow PUCCH transmission of LTE/NR to be continuous with each other.

Simultaneous transmission of LTE PUCCH/NR PUSCH: The PUCCH of LTE and the PUSCH of NR may be adjacent to each other by dynamic scheduling. In case of SPS PUSCH, a method similar to the aforementioned case of LTE PUCCH/NR PUCCH may be applied, or a frequency position of the SPS PUSCH may not be changed.

Simultaneous transmission of LTE PUSCH/NR PUSCH: It may be achieved based on network scheduling.

Figure 14:
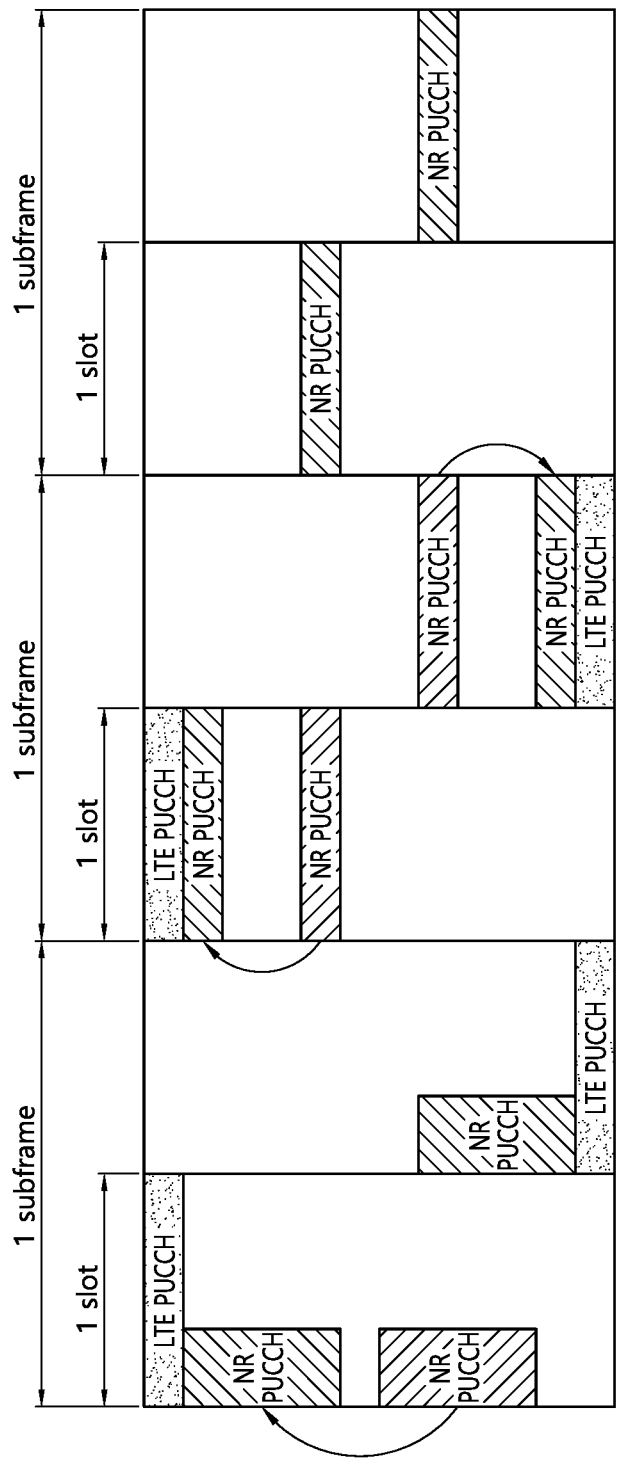
FIG. 14 shows an example of PUCCH transmission of LTE/NR according to an embodiment of the present disclosure.

FIG. 14 shows an example of PUCCH transmission of LTE/NR according to an embodiment of the present disclosure. The embodiment of FIG. 14 shows PUCCH simultaneous transmission of LTE/NR to minimize a PAPR. Referring to FIG. 14, PUCCH transmission of NR may be scheduled or shifted so that PUCCH transmission of NR is close to PUCCH transmission of LTE. Since PUCCH transmission of LTE may exist in a resource used for PUCCH transmission of NR, such an operation may be configured only for a UE potentially having a coverage issue (i.e., a UE requiring a PAPR reduction).

In particular, whenever simultaneous transmission of LTE/NR occurs, an NR PUCCH/PUSCH transmission format including a waveform may fallback to an LTE format. For example, there may be an NR PUCCH format completely the same as an LTE PUCCH format 1 or 3. This is to effectively allow multiplexing between the PUCCH of LTE and the PUCCH of NR. In addition, for more effective multiplexing, an HARQ-ACK resource index may be dynamically or semi-statically indicated for the NR PUCCH.

(3) TDM/FDM Dynamic Switching

A network may switch an LTE-NR multiplexing scheme between FDM and TDM, based on power headroom reporting (PHR) or UE triggering. When the switching is applied, whether TDM-based multiplexing is applied only to PUCCH/PRACH transmission or to all UL transmissions may also become obvious.

3. DC at the Same Frequency (1) Control Channel Reception

A UE may expect one or more control channels in one slot. However, processing power of the UE may be limited. Each control channel may perform the same slot scheduling or cross-slot scheduling. Even if the UE expects to receive a single control channel, the UE may receive a plurality of control channels. In this case, one control channel may perform one identical slot scheduling, and another control channel may perform one cross-slot scheduling. That is, the UE may expect to receive one or more control channels, and instead, each control channel may schedule up to one data channel in each slot.

Meanwhile, the UE may also support scheduling of different data having different numerologies or different TTI lengths (e.g., mini slot-based scheduling). Therefore, if the UE supports reception of one or more data channels (e.g., by supporting both slot-based/mini slot-based scheduling or by supporting reception of a plurality of data channels), the UE may process one or more data channels. However, a maximum transport block size (TBS) or the number of layers shall be equal to or less than a maximum UE capability. That is, in a DC at the same frequency not through consecutive CAs in a band, the processing power of the UE may be shared between two CGs/subcarriers. A blind decoding capability of the UE may also be shared between the two CGs/subcarriers. As described above, the UE capability may be shared between the two CGs/subcarriers, and adjustment may be semi-statically or dynamically achieved between the two CGs/carriers. In terms of the UE, the UE does not have to perform processing exceeding its capability. Therefore, when the UE is configured of such an operation, the processing on one TRP may be reduced. However, if the UE supports a CA capability, the UE may use a CA capability for such an operation. To this end, a UE capability for a radio frequency (RF) and a baseband shall be separately indicated, and if such an operation is used, the UE capability for the baseband may be shared.

In particular, if the UE has a plurality of RFs and supports a wideband carrier, the following procedure may be considered.

If the UE is served by one cell at one frequency (i.e., a DC is not configured across a plurality of cells at the same frequency), a plurality of RFs of the UE may be used towards one cell to extend the entire bandwidth.

If the UE is requested to switch a cell since the DC is configured across the plurality of cells at the same frequency, the plurality of RFs of the UE may be used at the same frequency domain. Alternatively, each RF may be coupled with one cell, and a frequency domain in which each RF is used may be different per cell. That is, when the DC is configured, each RF may access a different frequency domain in a carrier. Alternatively, one RF may support both of two cells, and a plurality of RFs may support a wideband operation across the two cells.

The aforementioned method may be applied by being selected according to a synchronous state. For example, in the synchronous state, each RF may access a different frequency domain in a carrier, or one RF may support both of two cells and a plurality of RFs may support a wideband operation across the two cells. In an asynchronous state, the plurality of RFs of the UE may be used in the same frequency domain.

When a bandwidth adjustment is used, if two TRPs transmit a control channel to the UE with respect to at least control channel reception, a bandwidth for a control channel is necessarily configured to include all CORESETs from each TRP. This may be achieved by defining a UE RF/baseband for the control channel as a union of the configured CORESETs, irrespective of whether the CORESET is configured for one or more TRPs.

Alternatively, a different bandwidth part (BWP) may be configured to the UE according to the TRP. This is necessary particularly when different center frequencies are used between the TRPs.

If the UE is connected with two TRPs to receive a control channel/data, a center frequency and bandwidth of an NR carrier from each TRP may be configured differently between the TRPs. In this case, a plurality of direct current (DC) tones may be indicated to the UE, and one or more DC tones may be used in each slot.

(2) BWP

Figure 15:
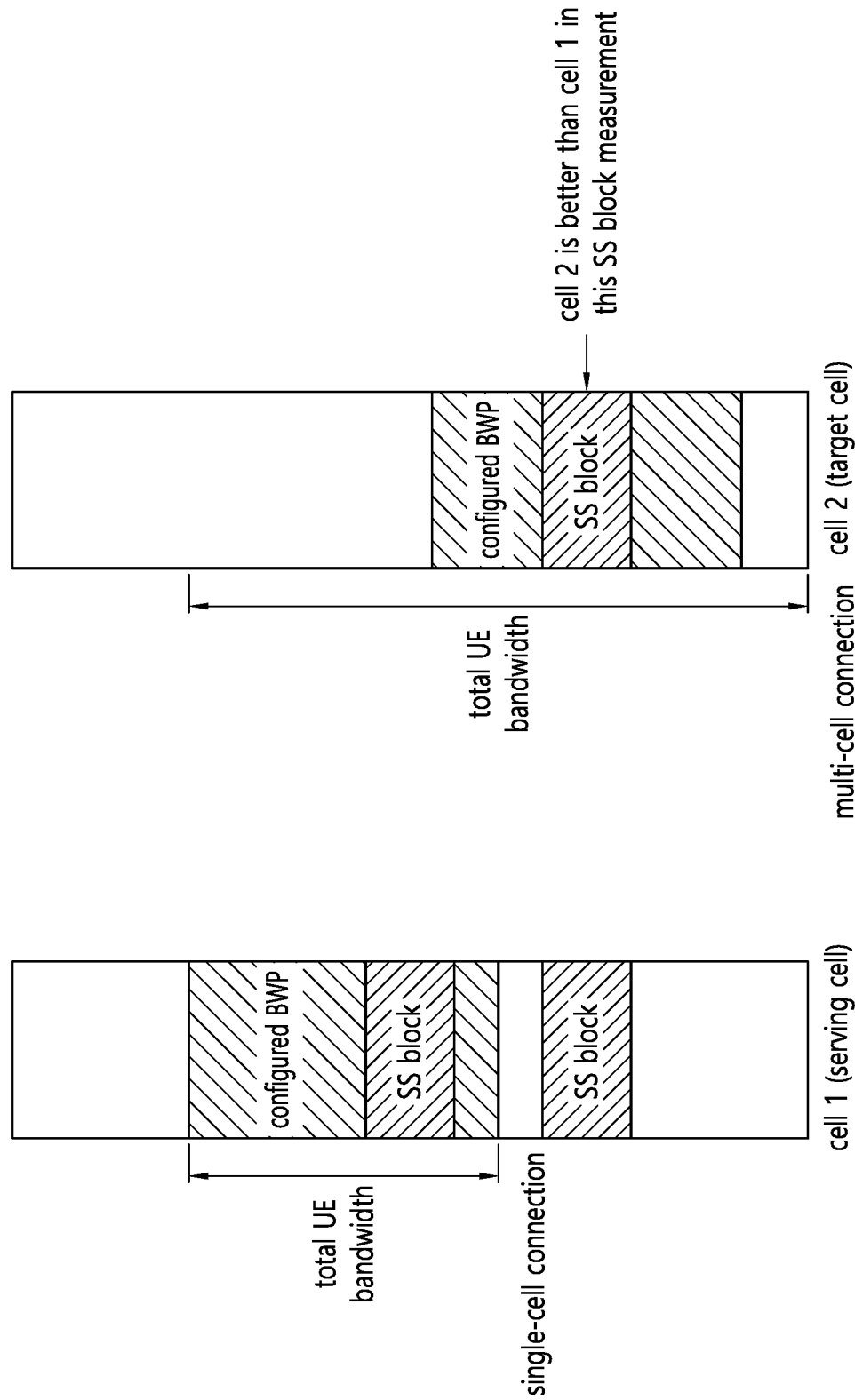
FIG. 15 shows an example of a BWP configuration according to an embodiment of the present disclosure.

FIG. 15 shows an example of a BWP configuration according to an embodiment of the present disclosure. When a UE adjusts a bandwidth within one carrier, a synchronization signal (SS) block of a neighboring cell having better quality may be detected according to a measurement result. Referring to FIG. 15, a BWP around the SS block may be configured as a target cell.

If the UE consists of a plurality of BWPs and if each BWP is mapped to each cell and a plurality of BWPs are activated, the entire RF bandwidth may be greater than each BWP. If the UE can simultaneously support the plurality of BWPs, the network shall not configure a DC to the UE. That is, in order for the UE to access different BWPs in a plurality of cells, the total bandwidth required for the UE shall be smaller than a bandwidth capability of the UE. When the DC is configured, in terms of a UL carrier, sharing of a UL resource may be used in a TDM manner. If sharing of the UL resource is used in an FDM manner, the same TA may be used between two CGs, or CA within a band having a UL transmission timing which may potentially vary shall be processed.

4. Single TX Processing Through Aggregation of CA or MAC Level

Figure 16:
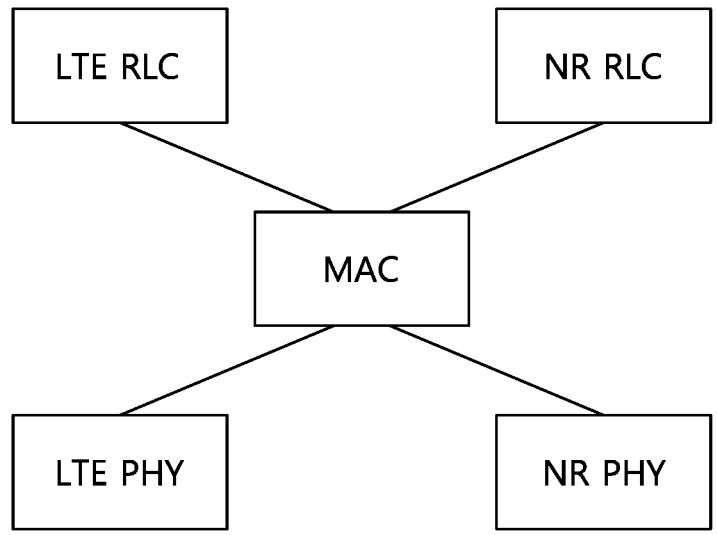
FIG. 16 shows sharing at a MAC level between two CGs according to an embodiment of the present disclosure.

FIG. 16 shows sharing at a MAC level between two CGs according to an embodiment of the present disclosure. For single TX processing, a MAC entity may be shared between the two CGs.

When MAC is shared between the two CGs, transmission of a control channel/data through a single activated UL carrier may consider the following aspects. First, if the UE needs to transmit a PRACH, the PRACH may have a higher priority than other channels. For PRACH transmission, the UE may omit transmission of other channels. In addition, in each subframe (or a slot having a longer length between carriers of the two CGs), the UE may determine a first UL carrier for transmitting a UL data/control channel. The first UL carrier may be determined by considering the following aspects.

According to semi-static UL resource split, the first CG may be determined for each subframe. The semi-static UL resource split may be performed based on a slot of a reference numerology or based on a greater slot between the two CGs or based on a subcarrier spacing of 15 kHz or based on a subframe.

The first CG may be determined as a CG in which PUCCH or UCI transmission occurs. If the two CGs both have UCI transmission, MCG may be defined as the first CG. If the two CGs both do not have UCI transmission and if the two CGs both have PUSCH transmission, MCG may be defined as the first CG. If only any one of CGs has UL transmission at any start point of a subframe, a CG having UL transmission may be defined as the first CG.

The first CG may always be defined as MCG.

The first CG may always be defined as SCG.

A minimum round trip time (RTT) of each CG may be used to determine the first CG in each subframe. Based on a CG having a longer processing time or a longer minimum RTT, if there is UL transmission scheduled in a subframe n, the CG having the longer processing time or the longer minimum RTT may be defined as the first CG. In another subframe, a different CG may be defined as the first CG. If one CG has a plurality of processing times, the first CG may be defined by a plurality of processing time units. For example, if the MCG supports a timing n+4 on the basis of a subframe TTI and a timing n+4 on the basis of a short TTI of two symbols and if the SCG supports a timing n+2 on the basis of a slot in a subcarrier spacing of 30 kHz (corresponding to one subframe TTI), a processing time order may be n+4 in the subframe, n+2 in the slot, and n+4 in the short TTI of two symbols. In a subframe k, if there is no UL transmission scheduled by the timing n+4 in the subframe, whether there is UL transmission based on the timing n+2 in the slot may be checked. If there is UL transmission based on the timing n+2 in the slot, the first CG in a corresponding subframe may be the SCG. If there is no UL transmission based on the timing n+2 in the slot, the first CG in a corresponding subframe may be the MCG. That is, the first CG may be determined by considering different processing times several times. Alternatively, in order to guarantee a sufficient processing time, the first CG may be defined as a CG having a shortest processing time or a shortest RTT.

On the basis of the first CG, all UL transmissions may be performed on the first CG. The MAC may transmit a payload on the basis of an RAT type of the first CG. If there is UCI of two RATs in the same subframe/slot, UCI transmission of a CG other than the first CG may be omitted. Alternatively, the UCI may be piggybacked to a PUSCH on the first CG.

Figure 17:
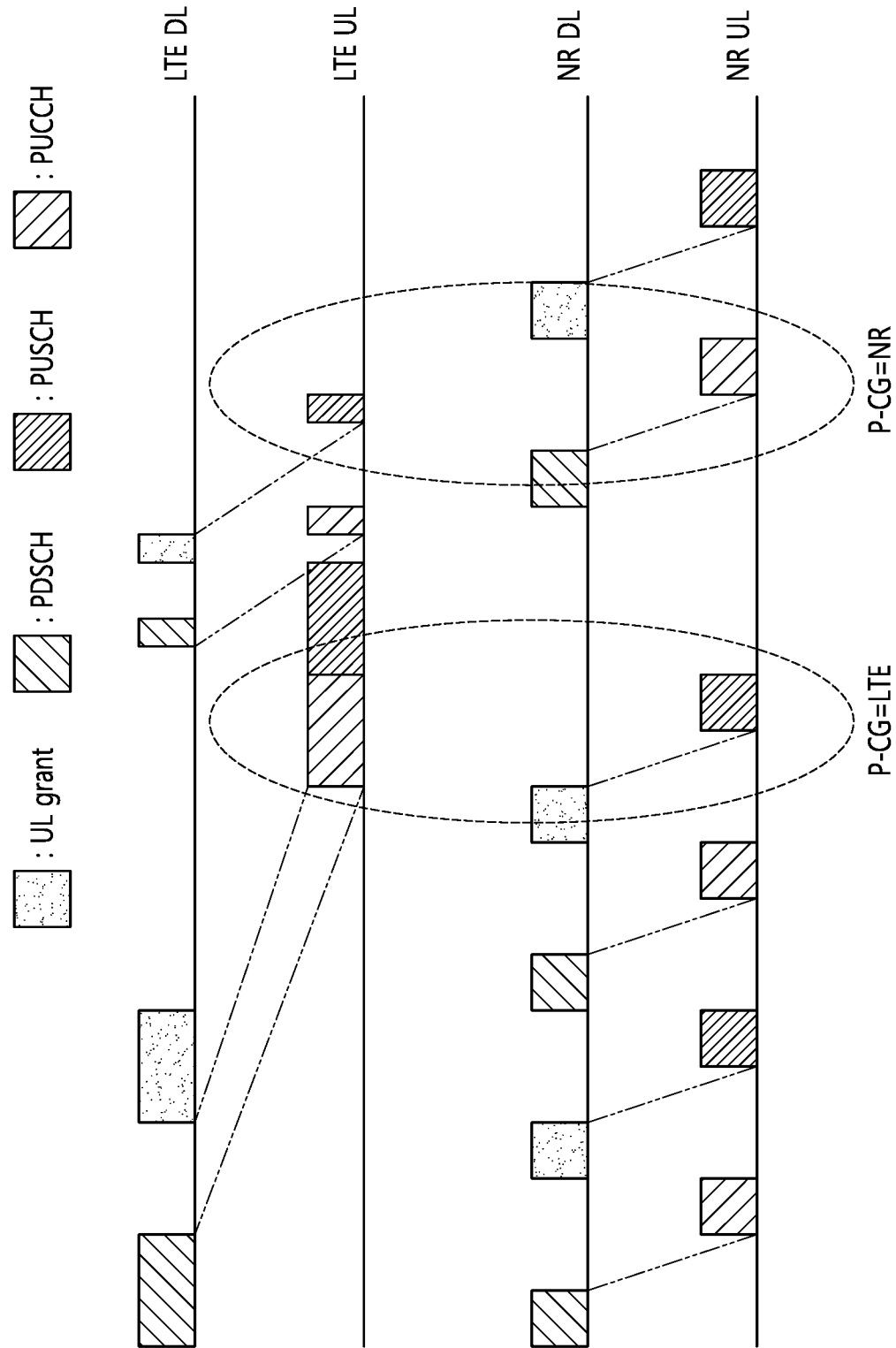
FIG. 17 and FIG. 18 show UL transmission according to an embodiment of the present disclosure.
Figure 18:
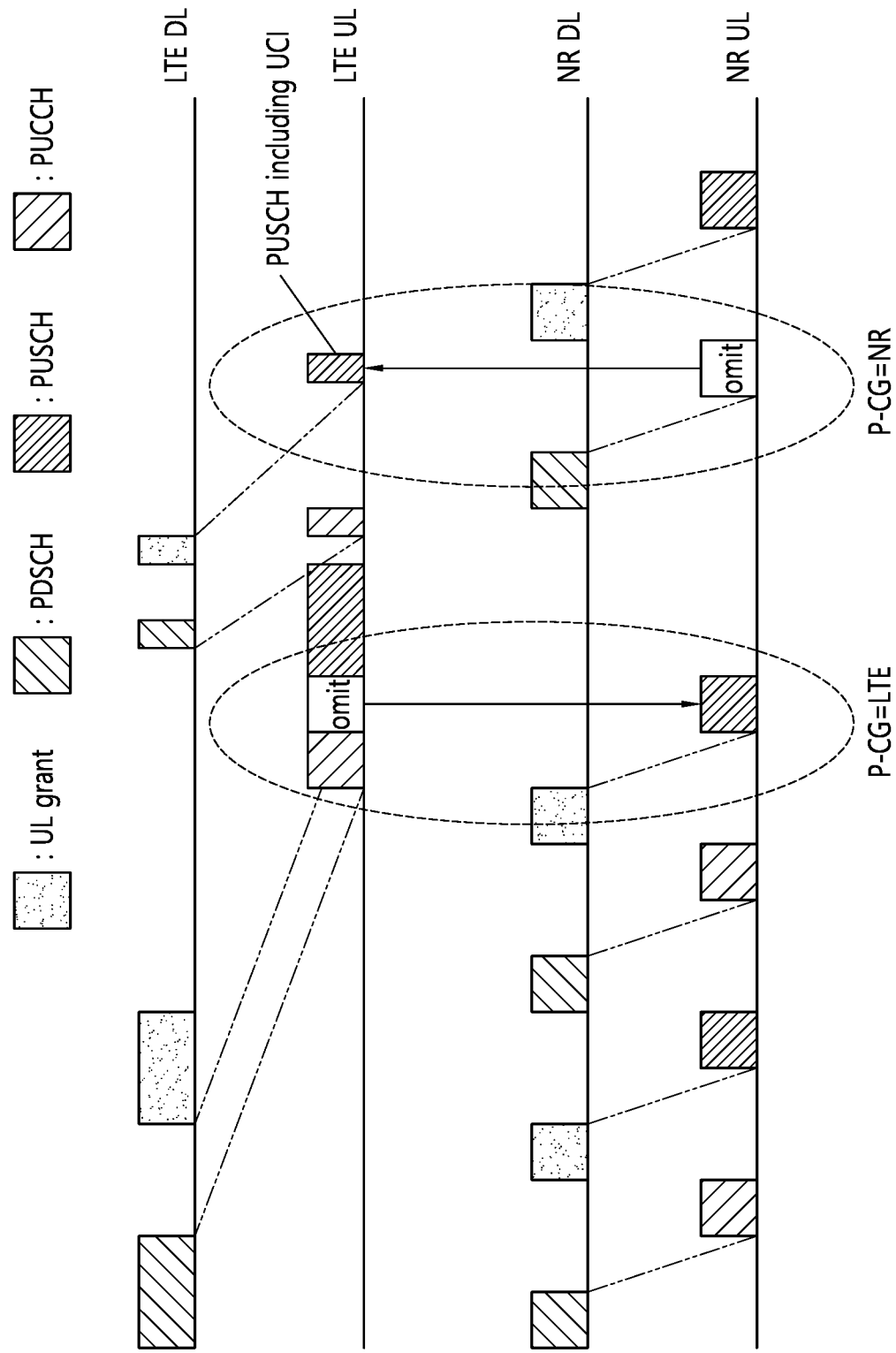

FIG. 17 and FIG. 18 show UL transmission according to an embodiment of the present disclosure. The aforementioned method is shown in FIG. 17 and FIG. 18.

If a UCI piggyback between CGs is not supported, UCI on a CG other than a first CG may be omitted. If MAC is shared between two CGs, this may be treated similarly to CA. That is, data may be aggregated to one PUSCH, and collision may be processed by a priority rule. It is different from the CA in that simultaneous transmission between UL carriers is not supported. Meanwhile, the present disclosure may also be applied to the CA without losing generality. Even if the MAC is not shared between the two CGs, the present disclosure may be applied to avoid collision between different channels having different processing times. The priority rule may be as follows.

A short processing time or a short RTT or a short TTI may have a higher priority. UCI on a channel having a lower priority may be piggybacked to a channel having a higher priority.

The MCG may have a higher priority.

The SCG may have a higher priority.

A priority between CGs may be configured by a higher layer.

In general, if a CA scheme or MAC sharing is used for single activation UL transmission, the following aspects may be considered. This may be applied when an eNB and a gNB or two gNBs coexist or are connected through an ideal backhaul in a DC irrespective of a DC configuration. Alternatively, since only UL is affected, an eNB and a DL gNB may coexist or may not be connected through the ideal backhaul. Based on the assumption for the backhaul, it may be assumed that at least the eNB and the gNB know UL scheduling information. However, it may be assumed that the eNB and the gNB do not know the UL scheduling information.

When a channel A of a first CG collides with a channel B of a second CG, the following aspects may be considered.

(1) TDM Scheme

In this case, the channel A and the channel B are not transmitted simultaneously. Any one of the channel A and the channel B may be transmitted based on a priority at a given time. The priority may be defined as follows.

Priority rule based on UCI type: For example, a priority based on a UCI type may be defined in the order of: SR=HARQ-ACK>periodic channel state information (CSI)>periodic SRS>PUSCH>periodic CSI>periodic SRS.

Priority rule based on processing time or TTI length: A shorter processing time or a shorter TTI may have a higher priority than a longer processing time or a longer TTI.

Priority rule pre-configured/defined by higher layer: A higher layer may pre-configure or define a priority between different channels in each CG. For example, the priority may be pre-configured or defined in the order of: PUSCH/PUCCH including HARQ-ACK in first CG>PUSCH/PUCCH including HARQ-ACK in second CG>aperiodic CSI in first CG>aperiodic CSI in second CG>PUSCH in first CG>PUSCH in second CG>aperiodic SRS (preferentially first CG)>periodic CSI (preferentially first CG)>periodic SRS (preferentially first CG).

Priority rule based on combination of UCI type and CG: For example, a priority rule based on the aforementioned UCI type is applied, and for the same UCI type, a first CG may have a higher priority than a second CG.

Transmission in progress: If transmission has already started, the transmission cannot be interrupted. If the transmission has not started, omission of the transmission may be considered on the basis of a priority rule.

For a channel having a lower priority, the following aspects may be considered.

Omit entire transmission

Omit transmission only in overlapping portion and necessary TA/switch adjustment gap Omit transmission only in slot overlapping with channel having higher priority Change of format and/or transmission duration and/or transmission timing: A transmission duration and/or timing of a channel having a lower priority may be adjusted to avoid collision. In order to change the type and/or transmission duration/timing of the channel having the lower priority, when the channel having the lower priority and corresponding data (e.g., PDSCH for HARQ-ACK) is scheduled through DCI, two format types and/or time/frequency resources may be indicated. A first configuration may be used when there is no collision with a channel having a higher priority. If the collision occurs, a second configuration may be used. If the collision occurs in both of the configurations, the channel having the lower priority may be processed according to a method described below.

It may be processed as follows according to content of the channel having the lower priority.

SR: If the channel having the lower priority has a shorter processing time than the channel having the higher priority, the SR may be piggybacked to the channel having the higher priority. Alternatively, if the channel having the lower priority has a longer processing time than the channel having the higher priority, the SR may be piggybacked to the channel having the higher priority. A similar method may be applied to HARQ-ACK and aperiodic CSI.

Periodic CSI: it may be omitted.

Aperiodic SRS: It may not be omitted since it cannot be piggybacked.

Periodic SRS: It may be omitted since it cannot be piggybacked.

Data: If a processing time is allowed, it may be processed according to network scheduling/higher layer scheduling. Otherwise, data transmission may be omitted.

(2) UCI Piggyback

If a UCI piggyback is considered in a channel of a different CG, UCI of a CG A having a longer processing time or longer TTI may be piggybacked on a channel of a CG B.

If the UCI of the CG A is piggybacked to a PUCCH of the CG B, a PUCCH format capable of including many payloads may be used. In general, a method in which UCI from a long TTI is used in an operation of a short TTI that can be included in short TTI transmission may be directly applied herein. To this end, a plurality of PUCCH resources may be indicated to a UE, and one PUCCH resource may be selected according to a PUCCH format or whether UCI of the different CG is piggybacked. For example, if the UCI of the different CG is not piggybacked, a format similar to a PUCCH format 1a/1b may be used, and if the UCI of the different CG is piggybacked, a format similar to a PUCCH format 3 may be used. A resource (time/frequency resource and HARQ-ACK resource index) may be different according to a PUCCH format. Therefore, a network may indicate both of two resources in scheduling. Alternatively, if the network knows that the piggyback will be achieved, only a resource for the format similar to the PUCCH format 3 may be indicated. Alternatively, one or more resources may be indicated. For example, for HARQ-ACK, two resources may be indicated. A CSI piggyback may be configured based on a periodic CSI configuration. In addition, a plurality of resources may be indicated for aperiodic CSI.

When UCI of a CG A is piggybacked to a PUSCH of a CG B, a method similar to the aforementioned method may be applied. However, in a piggyback mechanism including a resource position, different mapping between UCI thereof and UCI of a different CG may be considered.

5. DC in Half-Duplex (HD) DL and UL

As another consideration of a band combination for a DC (including a DC of LTE-NR, a DC of NR-NR, and CA of an NR carrier), there is a need to consider harmonics between a UL frequency (e.g., f1) and a DL frequency (e.g., f2≈2*f1). In this case, UL harmonics may have effect on DL reception. In general, if the harmonics are not severe, this may be processed by decreasing a modulation and coding scheme (MCS) or by using other implementation techniques. Considering a UE of a low-complexity for configuring a DC, a half-duplex mode between high-frequency UL and high-frequency DL may be considered. A UL carrier in one CG and a DL carrier in a different carrier are required according to the half-duplex mode. In particular, if the CG is dual-connected through a non-ideal backhaul, adjustment between DL and UL may be necessary. As described above, even if the half-duplex mode is configured, semi-static or dynamic resource split/sharing may be considered. However, in resource split between DL and UL, the following aspects may be additionally considered in terms of measuring, tracking, or the like.

(1) Semi-static resource split: If semi-static resource split is used between DL of one CG and UL of a different CG, the semi-static resource split may be indicated to the UE, and the UE may expect to perform measurement on a configured DL resource. If a measurement signal of one CG is periodically transmitted, the semi-static resource split shall be able to cover a measurement resource transmitted periodically. In order to indicate a sub-set of DL resources, a TDD DL/UL configuration may be provided to the UE. The UE may expect that DL or DwPTS (downlink pilot time slot) is used for DL of one CG, and UL or UpPTS (uplink pilot time slot) is used for UL of a different CG. A GP may be used in DL.

If one CG uses FDD, this means that the number of DL subframes/slots is less than the number of UL subframes/slots. In NR, this may be processed by multi-TTI scheduling. In LTE, there is a need to process this also by multi-TTI scheduling. Alternatively, this may be processed based on a UL index. Alternatively, a framework of cross-carrier scheduling of TDD-FDD CA may be used. That is, this may be similar to a case where PCell uses TDD and a UL carrier is treated similarly to an FDD SCell. For PUSCH transmission, a framework of cross-carrier scheduling (including a UL index) of TDD-FDD CA may be used.

If one CG uses TDD, the same TDD DL/UL configuration or a TDD DL/UL configuration including DL or DwPTS included in the current TDD DL/UL configuration may be indicated. In this case, UL transmission in a different CG may use a portion other than DL or DwPTS. A GP may be used for UL transmission of the different CG.

(2) Dynamic resource split: Only when there is no DL reception of one CG, UL transmission in the different CG may be allowed. For example, if there is no measurement or scheduled PDSCH, at least a PDSCH portion may be used for UL transmission. That is, UL transmission may occur opportunistically only when there is no DL scheduling. To support this, a network needs to know a processing time of a control channel after transmission of a control signal. Accordingly, the UE may switch to UL transmission. Meanwhile, even if this method is used, some resources may be reserved for UL transmission such as PRACH transmission or the like.

(3) Hybrid method: The aforementioned methods (1) and (2) may be used in combination. For example, a first CG may be defined by semi-static resource split to use a time resource. If the first CG is not used, a different CG may be used by borrowing the resource. In this case, as described above, there may be a need to consider a sufficient processing time when the resource is allocated to the different CG. For example, to detect a DL portion not used, there is a need to consider a processing time of a control channel. To detect a UL portion not used, there is a need to consider a processing time between a control channel and a UL channel. For example, if there is a possibility that UL transmission will occur in the near future, mini slot-based DL transmission may be used, which may be complete before potential PUSCH scheduling/transmission. For another example, if a PUSCH is scheduled in a symbol K at a slot n, a DL resource may be used for DL transmission from a symbol 1 to a symbol K-1. Therefore, PUSCH transmission in the symbol K may be guaranteed. Alternatively, if the PUSCH is scheduled, DL transmission may be omitted.

6. UCI Piggyback in SUL Carrier

In NR, a DL carrier may be associated with one or more UL carriers. In this case, one or more UL carriers may include a UL carrier and an SUL carrier. Although it is assumed that only one SUL carrier exists for each UL band, it may be generalized that a plurality of SUL carriers exist. The SUL carrier may be treated differently from a UL carrier, which is not to allow a cell having only UL in terms of a cell configuration. In this aspect, a carrier having only UL needs to be associated with a DL carrier, and the DL carrier may have a plurality of associated UL carriers. One TB may be processed at a time on a configured UL carrier.

Meanwhile, a numerology may be different between two UL carriers. In this case, the following aspects may be considered.

(1) TA

The same TA may be applied to two UL carriers. A numerology based on TA may be determined by a numerology used in a PUCCH. That is, a numerology used in a UL carrier in which a PUCCH is transmitted may be used to indicate TA. In an RACH procedure, the numerology used in the PUCCH may be identical to a numerology used in an Msg3. If a cell for transmitting the PUCCH is changed or the numerology used in the PUCCH is different from the numerology used in the Msg3, a configured offset may be converted based on the numerology used in the PUCCH (i.e., may accept a TA value), and may be updated based on the numerology used in the PUCCH.

TA may be configured separately for each cell. In this case, a numerology of each cell may be used.

(2) Transmit Power Command (TPC)

TPC may be used separately among a plurality of UL carriers. A TPC value may be updated based on a UL grant having a UL carrier index. As an initial value, a value determined from an RACH procedure via a necessary offset adjustment may be used for each UL carrier. That is, if the RACH procedure is performed on the UL carrier, initial power in an SUL carrier may be determined based on an offset between two UL carriers. Thereafter, TPC update may be performed independently in each UL carrier.

Alternatively, the initial value may be determined based on an RACH procedure triggered on the SUL carrier (i.e., differently from a value obtained from the RACH procedure performed on the UL carrier).

(3) UCI Piggyback

If a cell for transmitting a PUCCH is different from a cell for transmitting a PUSCH, there is a possibility that the PUCCH and the PUSCH collide with each other. In this case, a PUCCH having HARQ-ACK/SR may have a highest priority. In addition, a PUSCH including UCI including aperiodic CSI may have a higher priority than a PUCCH including periodic CSI. In addition, a PUSCH including UCI including semi-persistent CSI may have a higher priority than a PUCCH including periodic CSI. In addition, a PUSCH without UCI may have a higher priority than a PUCCH including periodic CSI. In general, a priority of HARQ-ACK/SR>PUSCH including UCI>PUSCH>PUCCH having periodic CSI may be used to determine which channel's transmission will be omitted when collision occurs.

Meanwhile, the following rule may be considered in the determining of the collision. Two or more channels may collide in a resource of at least one symbol, based on a greatest subcarrier spacing used in a channel. When the collision occurs, a UE may attempt to piggyback UCI to a PUSCH if the following condition is satisfied.

1) In PUSCH transmission in a symbol i of a slot k, a processing time of UCI piggyback may be determined as k0 symbols. If the UCI is available before the K0 symbols of a current slot/symbol of a PUSCH start point, this may be regarded as UCI that can be piggybacked.

2) The following two cases may be considered in the determining of k0. For a UCI type requiring a rate matching operation, k0 may be greater than a timing k2 between PDCCH-PUSCH or may be equal to k2. Alternatively, k0 may be determined as a greater value between k2 and the timing k1 between PDSCH-PUCCH. Meanwhile, the timing between PDCCH-PUSCH may be n0. For a UCI type using puncturing, k0 may be 1 symbol, and this may be determined according to a UE capability. That is, the UE may report its capability, and thus k may consist of 1 symbol. That is, if UCI is available before k2 symbols of PUSCH transmission, the UCI may be piggybacked. K0 and k2 may be indicated separately, and k0 may be less than k2 according to the UE capability.

3) In the determining of whether the UCI is available, the UCI may be available at the last of CSI-RS resource+ aperiodic CSI processing time and at the last of PDSCH resource+data processing time (for HARQ-ACK). In the determining of k2, PUSCH transmission without aperiodic CSI or UCI or PUSCH transmission including aperiodic CSI may be considered separately. In the determining of k1, a delay time may be determined as a sum of data processing+ data preparation. Therefore, the UE may report its capability for each UL carrier in terms of {k0, k1, k2}. Each of k0, k1, and k2 may exceed 14 symbols. K0 denotes a processing time for UCI piggyback, k1 denotes a timing between PDSCH-PUCCH, and k2 denotes a timing between PDCCH-PUSCH without consideration of UCI piggyback.

A timing of (UL1,k0, UL1,k1, UL1,k2) is defined in a UL carrier 1.

A timing of (UL2,k0, UL2,k1, UL2,k2) is defined in a UL carrier 2.

A piggyback in the UL carrier 2 may be performed when a PDSCH ends earlier than (UL2,k0+UL2,k2) before a PUSCH starts. Alternatively, the piggyback in the UL carrier 2 may occur at a greater value between (UL2,k0, UL2,k2) before a PUSCH for HARQ-ACK piggyback starts. Alternatively, the piggyback in the UL carrier 2 may occur at a greater value between (UL1,k0, UL2, k0) or a greater value between (UL2,k0) or at (UL1,k1, UL2,k1).

The piggyback in the UL carrier 2 may be performed when a CSI-RS resource ends earlier than (UL2,k0+ UL2,k2) before a PUSCH starts. Alternatively, the piggyback in the UL carrier 2 may occur at a greater value between (UL2,k0, UL2,k2) before a PUSCH for periodic or semi-persistent CSI piggyback starts. Alternatively, the piggyback in the UL carrier 2 may occur at a greater value between (UL1,k0, UL2,k0) or a greater value between (UL2,k0) or at (UL1,k1, UL2, k1).

Alternatively, instead of the sum or the greater value, a delta delay may be added to the sum or the greater value to consider an additional delay of UCI piggyback. The delta value may be k2'-k2, where k2' denotes a processing delay of UCI piggyback. Alternatively, k2' may be used instead of k2 if a PUSCH has aperiodic CSI.

Alternatively, the piggyback may be separately determined according to a UCI type. For HARQ-ACK, if the PDSCH ends earlier than (UL2,k0), the HARQ-ACK may be piggybacked to the PUSCH. For periodic or semi-persistent CSI, if a CSI-RS resource ends earlier than (UL2,k0), the periodic or semi-persistent CSI may be piggybacked to the PUSCH. For aperiodic CSI on the PUCCH, a processing time of aperiodic CSI may be used. In this case, the CSI-RS resource may end earlier than (UL2,k2').

The aforementioned method may also equally apply to the UL carrier 1.

In case of HARQ-ACK+CSI, if HARQ-ACK satisfies a requirement of a processing time and if CSI does not satisfy the requirement, only the HARQ-ACK is piggybacked, and CSI transmission may be omitted. Otherwise, if the CSI satisfies the requirement of the processing time and if the HARQ-ACK does not satisfy the requirement, PUSCH transmission may be omitted, and a PUCCH may be transmitted. If specific UCI satisfies the requirement of the processing time (e.g., if only some of HARQ-ACK bits satisfy the requirement), overall UCI transmission may be omitted. That is, split of UCI feedback is not supported.

4) If the piggyback is not available due to the processing time, channel transmission may be omitted based on a priority.

5) If a PUSCH transmission duration is less than P symbols, it may be considered not to piggyback CSI to minimize an influence on the PUSCH.

6) The network may configure whether the PUSCH piggyback is allowed after the PUSCH starts.

7) The UE may piggyback HARQ-ACK feedback to the PUSCH only when an orthogonal cover code (OCC) is not used in the PUCCH.

8) In case of multi-slot PUCCH transmission, the piggyback may be performed for each slot. That is, a slot may be used for the piggyback, and another slot may be used for PUCCH transmission. Alternatively, multi-slot PUCCH transmission may be regarded as one transmission.

Figure 19:
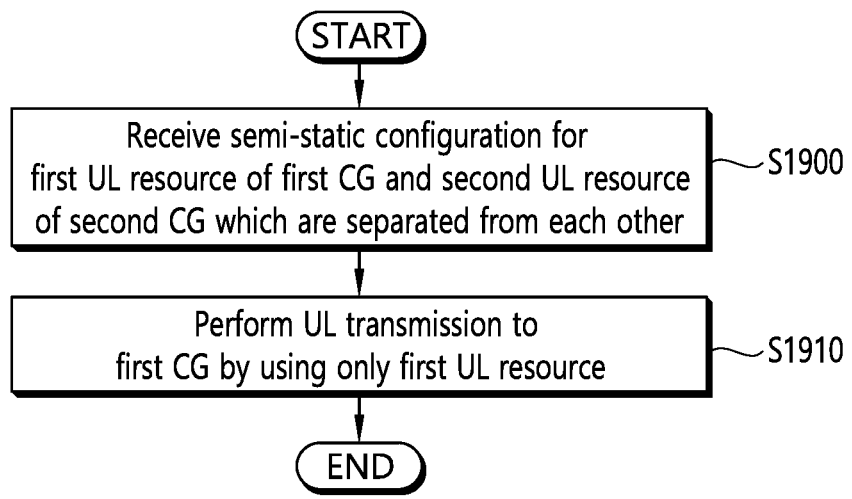
FIG. 19 is a block diagram of a method of performing UL transmission by a UE according to an embodiment of the present disclosure.

FIG. 19 is a block diagram of a method of performing UL transmission by a UE according to an embodiment of the present disclosure. The aforementioned various aspects of the present disclosure are applicable to the present embodiment.

In step S1900, the UE receives a semi-static configuration for a first UL resource of a first CG and a second UL resource of a second CG which are separated from each other. In step S1910, the UE performs UL transmission to the first CG by using only the first UL resource.

The first UL resource and the second UL resource may be separated from each other in a time domain in a timing division multiplexing (TDM) manner. UL transmission for an initial access procedure in the first CG may always be performed irrespective of the semi-static configuration for the first UL resource and second UL resource. The first CG may be a CG of LTE, and the second CG may be a CG of NR.

UL transmission to the first CG may have priority in the first UL resource, and UL transmission to the second CG may have priority in the second UL resource. If the first UL resource is not used for UL transmission to the first CG, the first UL resource may be used by the second CG. Alternatively, if the second UL resource is not used for UL transmission to the second CG, the second UL resource may be used by the first CG. In addition, if UL transmission to the first CG is scheduled for the second UL resource, UL transmission to the scheduled first CG may be omitted irrespective of whether there is UL transmission to the second CG in the second UL resource.

The semi-static configuration may be received before the second CG is activated. The first UL resource may be a set of first UL subframes, and the second UL resource may be a set of second UL subframes.

Figure 20:
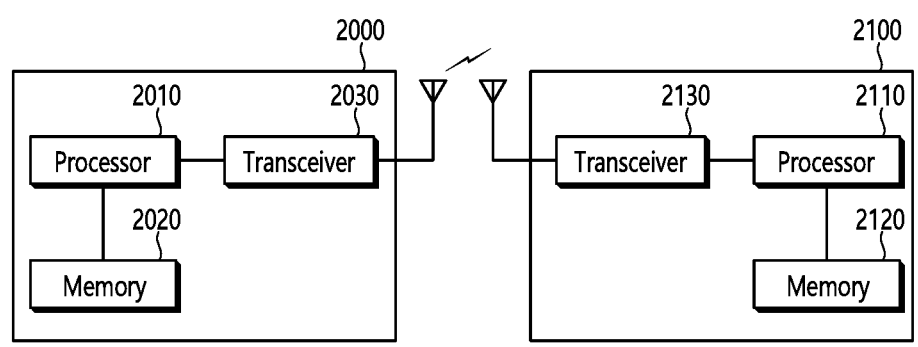
FIG. 20 shows a wireless communication system to implement an embodiment of the present disclosure.

FIG. 20 shows a wireless communication system to implement an embodiment of the present disclosure.

A UE 2000 includes a processor 2010, a memory 2020 and a transceiver 2030. The processor 2010 may be configured to implement proposed functions, procedures and/or methods described in this description. Layers of the radio interface protocol may be implemented in the processor 2010. The memory 2020 is operatively coupled with the processor 2010 and stores a variety of information to operate the processor 2010. The transceiver 2030 is operatively coupled with the processor 2010, and transmits a radio signal to a network node 2010 or receives a radio signal from the network node 2100.

The network node 2100 includes a processor 2110, a memory 2120 and a transceiver 2130. The processor 2110 may be configured to implement proposed functions, procedures and/or methods described in this description. Layers of the radio interface protocol may be implemented in the processor 2110. The memory 2120 is operatively coupled with the processor 2110 and stores a variety of information to operate the processor 2110. The transceiver 2130 is operatively coupled with the processor 2110, and transmits a radio signal to the UE 2000 or receives a radio signal from the UE 2000.

The processors 2010, 2110 may include application-specific integrated circuit (ASIC), other chipset, logic circuit and/or data processing device. The memories 2020, 2120 may include read-only memory (ROM), random access memory (RAM), flash memory, memory card, storage medium and/or other storage device. The transceivers 2030, 2130 may include baseband circuitry to process radio frequency signals. When the embodiments are implemented in software, the techniques described herein can be implemented with modules (e.g., procedures, functions, and so on) that perform the functions described herein. The modules can be stored in memories 2020, 2120 and executed by processors 2010, 2110. The memories 2020, 2120 can be implemented within the processors 2010, 2110 or external to the processors 2010, 2110 in which case those can be communicatively coupled to the processors 2010, 2110 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What is claimed is:

1. A method performed by a wireless device in a wireless communication system, the method comprising:
    establishing a dual connectivity (DC) with a first cell group (CG) and a second CG;
    receiving a configuration for a single uplink (UL) transmission informing a set of UL subframes for the first CG; and
    performing the single UL transmission using the configuration for the single UL transmission while the DC is established,
    wherein the single UL transmission is performed such that a UL transmission to the first CG is performed in the set of UL subframes while a UL transmission to the second CG is not performed in the set of UL subframes, and
    wherein the configuration for the single UL transmission is used based on the single UL transmission being required by an intermodulation distortion (IMD) related to UL transmissions on the first CG and the second CG.

2. The method of claim 1, wherein a UL subframe for the first CG and a UL subframe for the second CG are separated from each other in a time domain in a time division multiplexing (TDM) manner.

3. The method of claim 2, further comprising:
performing a UL transmission for an initial access procedure in the first CG irrespective of the configuration for the single UL transmission.

4. The method of claim 1,
wherein the first CG is a CG of long-term evolution (LTE), and
wherein the second CG is a CG of new radio (NR).

5. The method of claim 1, wherein, if a UL transmission to the first CG is scheduled in a UL subframe for the second CG, the scheduled UL transmission to the first CG is omitted irrespective of whether there is a UL transmission to the second CG in the UL subframe for the second CG.

6. The method of claim 1, wherein the configuration is received before the second CG is activated.

7. The method of claim 1, wherein the wireless device is in communication with at least one of a mobile device, a network, or autonomous vehicles other than the wireless device.

8. A wireless device in a wireless communication system, the wireless device comprising:
a memory;
a transceiver; and
at least one processor operatively coupled with the memory and the transceiver,
wherein the at least one processor is configured to:
establish a dual connectivity (DC) with a first cell group (CG) and a second CG;
control the transceiver to receive a configuration for a single uplink (UL) transmission informing a set of UL subframes for the first CG; and
control the transceiver to perform the single UL transmission using the configuration for the single UL transmission while the DC is established,
wherein the single UL transmission is performed such that a UL transmission to the first CG is performed in the set of UL subframes while a UL transmission to the second CG is not performed in the set of UL subframes, and
wherein the configuration for the single UL transmission is used based on the single UL transmission being required by an intermodulation distortion (IMD) related to UL transmissions on the first CG and the second CG.

9. The wireless device of claim 8, wherein a UL subframe for the first CG and a UL subframe for the second CG are separated from each other in a time domain in a time division multiplexing (TDM) manner.

10. The wireless device of claim 8, wherein the at least one processor is further configured to control the transceiver to perform a UL transmission for an initial access procedure in the first CG irrespective of the configuration for the single UL transmission.

11. The wireless device of claim 8,
wherein the first CG is a CG of long-term evolution (LTE), and
wherein the second CG is a CG of new radio (NR).

12. A non-transitory computer-readable medium having stored thereon a plurality of instructions for a wireless device in a wireless communication system, wherein the plurality of instructions cause the wireless device to:
establish a dual connectivity (DC) with a first cell group (CG) and a second CG;
receive a configuration for a single uplink (UL) transmission informing a set of UL subframes for the first CG; and
perform the single UL transmission using the configuration for the single UL transmission while the DC is established,
wherein the single UL transmission is performed such that a UL transmission to the first CG is performed in the set of UL subframes while a UL transmission to the second CG is not performed in the set of UL subframes, and
wherein the configuration for the single UL transmission is used based on the single UL transmission being required by an intermodulation distortion (1 MB) related to UL transmissions on the first CG and the second CG.

* * * * *